US009953178B2

(12) United States Patent
Umbehocker

(10) Patent No.: US 9,953,178 B2
(45) Date of Patent: Apr. 24, 2018

(54) ROLE BASED ACCESS CONTROL UTILIZING SCOPED PERMISSIONS

(75) Inventor: Steven Michael Umbehocker, Mercer Island, WA (US)

(73) Assignee: OS NEXUS, Inc., Mercer Island, WA (US)

(*) Notice: Subject to any disclaimer, the term of this patent is extended or adjusted under 35 U.S.C. 154(b) by 633 days.

(21) Appl. No.: 12/699,511

(22) Filed: Feb. 3, 2010

(65) Prior Publication Data

US 2011/0191485 A1  Aug. 4, 2011

(51) Int. Cl.
*G06F 21/62* (2013.01)
*H04L 29/06* (2006.01)
*G06F 3/06* (2006.01)
*G06F 21/60* (2013.01)

(52) U.S. Cl.
CPC ........ *G06F 21/6218* (2013.01); *G06F 3/0605* (2013.01); *G06F 3/0622* (2013.01); *G06F 21/604* (2013.01); *G06F 21/6209* (2013.01); *H04L 63/0281* (2013.01); *H04L 63/0428* (2013.01)

(58) Field of Classification Search
CPC .. G06F 3/0622; G06F 3/0605; G06F 21/0601; G06F 21/6218; G06F 21/6209; H04L 63/0428; H04L 63/0281; H04L 67/1097
USPC ....... 709/203, 223, 224, 225, 226, 227, 228, 709/229
See application file for complete search history.

(56) References Cited

U.S. PATENT DOCUMENTS

| 5,664,187 | A  | * | 9/1997 | Burkes | G06F 3/0601 707/999.2 |
| 7,062,563 | B1 | * | 6/2006 | Lewis | H04L 61/1523 709/227 |
| 7,730,258 | B1 | * | 6/2010 | Smith | G06F 3/0622 711/114 |
| 8,601,534 | B2 | * | 12/2013 | Schiffman | G06F 9/5011 713/182 |
| 2002/0077803 | A1 | * | 6/2002 | Kudoh | G06F 21/6218 704/1 |

(Continued)

OTHER PUBLICATIONS

ISR and Written Opinion dated Apr. 11, 2011 for PCT Application Serial No. PCT/US11/22983, 15 pages.

*Primary Examiner* — Barbara B Anyan
(74) *Attorney, Agent, or Firm* — Amin, Turocy & Watson, LLP

(57) ABSTRACT

Systems and methods authorizing access to storage system resources are presented herein. A scoped permission assignment can be associated with an operation related to a type of at least one resource. The scoped permission assignment can be assigned to a role; and the role can be associated with user(s). A resource, or one or more resources of a resource group, can be associated with user(s) or user group(s). Further, a user can be authorized to perform the operation on the resource and/or one or more resources based on, at least in part, permission assignments directly granted to the user or granted in a role of the user. In addition, one or more resource flags can be assigned to the one or more resources. Accordingly, the user can be authorized to perform the operation based on, at least in part, the one or more resource flags and the scoped permission assignment.

18 Claims, 27 Drawing Sheets

(56) References Cited

U.S. PATENT DOCUMENTS

| | | | |
|---|---|---|---|
| 2003/0105830 A1* | 6/2003 | Pham | H04L 63/0281 709/216 |
| 2003/0115447 A1* | 6/2003 | Pham | H04L 63/0428 713/153 |
| 2004/0233910 A1* | 11/2004 | Chen | H04L 67/1097 370/395.5 |
| 2004/0243772 A1 | 12/2004 | Wissenbach | |
| 2005/0273600 A1* | 12/2005 | Seeman | G06F 21/6227 713/160 |
| 2006/0190611 A1* | 8/2006 | Miyazaki | G06F 3/0605 709/229 |
| 2007/0115924 A1* | 5/2007 | Schneider | H04L 29/06027 370/352 |
| 2007/0179954 A1 | 8/2007 | Kudoh et al. | |
| 2007/0260806 A1* | 11/2007 | Kito | G06F 3/0605 711/100 |
| 2008/0120302 A1* | 5/2008 | Thompson | G06F 21/6209 |
| 2008/0243856 A1 | 10/2008 | Corley et al. | |
| 2008/0244736 A1 | 10/2008 | Lampson et al. | |
| 2009/0265522 A1* | 10/2009 | Asano | G06F 21/6218 711/163 |

* cited by examiner

ROLE BASED ACCESS CONTROL UTILIZING SCOPED PERMISSIONS

TECHNICAL FIELD

This disclosure relates generally to role based access control including, but not limited to, role based access control utilizing scoped permissions, and related technologies.

BACKGROUND

Conventional techniques enable access to components and/or operations of a storage system via an access control system, in which one or more access privileges is assigned to one or more users of the storage system. Further, conventional role based access control (RBAC) techniques enable a user to access storage system resources based on a role assigned to the user. As such, the user is permitted to access and/or perform operations on the storage system based on one or more access privileges assigned to the role. For example, storage system operations such as "create storage volume" and "delete storage volume" can be assigned to an "administrator" role. When the user is assigned the administrator role, the user can create and/or delete any storage volume included in the storage system.

One concern with conventional RBAC techniques is that such techniques authorize access to storage system resources merely at an operational level. For example, when users of an RBAC storage system request privileges to create and/or delete objects, e.g., storage volumes, within the RBAC storage system, the users are assigned a role associated with such privileges. Accordingly, accidental and/or intentional data loss/unauthorized data access can result because the role authorizes each of the users to delete and/or access the storage volumes.

Further, although conventional RBAC techniques associate management privileges of such objects with a role, e.g., storage administrator, which can be assigned to a limited number of skilled personnel, such centralized control reduce user experience(s) within a virtualized storage system environment. For example, users of virtual machines of an RBAC storage system are required to manage, e.g., duplicate, administrate, etc. their virtual machines via a limited number of skilled personnel.

The above-described deficiencies of today's role based access control environments and related technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject innovations. Its sole purpose is to present some concepts of the disclosed subject matter in a simplified form as a prelude to the more detailed description presented later.

Although conventional RBAC techniques can enable a user to access storage system resources based on a role assigned to the user, accidental and/or intentional data loss/unauthorized data access can result when the role is assigned to more than one user. Further, although such techniques can assign a storage administration role to a limited number of skilled personnel, users can be required to manage their storage system resources via the limited number of skilled personnel.

To correct for these and other drawbacks of conventional RBAC techniques, various systems and methods described herein authorize access to storage system resources at an operational and storage object level—scoping operations and resources on which the operations can be performed.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
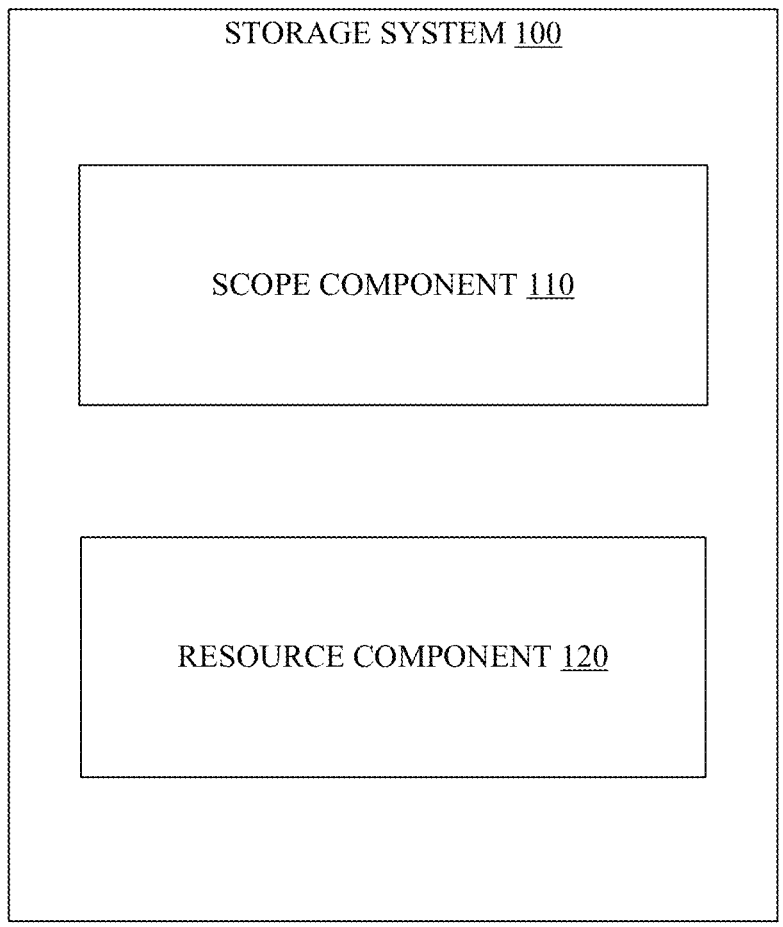
FIG. 1 illustrates a block diagram of a storage system, in accordance with an embodiment.

Various non-limiting embodiments of systems and methods presented herein authorize access to storage system resources by scoping the storage system resources and operations that can be performed on such resources.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal). As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via group component 620 (see below), to automatically combine storage pools of one or more storage pools based on at least one of a storage size of one or more storage mediums of the one or more storage pools or a utilization rate of the one or more storage mediums.

Moreover, the artificial intelligence system can be used, via quota management component 1110 (see below) to (1) automatically identify an amount of memory associated with a user of a storage system; (2) automatically monitor memory usage associated with the user; and (3) automatically alert the user that the user may be running out of resources and/or should consider purchasing and/or reconfiguring resources within the storage system. In yet another aspect, artificial intelligence system can be used, via billing component 1120 (see below), to automatically (1) determine storage system fees accrued by a user and (2) bill such fees to the user on a periodic, e.g., monthly, basis.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD)); smart card(s); and flash memory device(s) (e.g., card, stick, key drive).

As described above, conventional RBAC techniques authorize access to storage system resources merely at an operational level, which can result in accidental data loss and/or unauthorized data access. Further, conventional RBAC techniques can reduce user experience(s), for example, within a virtualized storage system environment because administrative roles are only assigned to a limited number of skilled personnel.

Compared to such technology, various systems and methods described herein authorize access to storage system resources at an operational and storage object level—scoping operations and resources on which the operations can be performed.

Referring now to FIG. 1, a block diagram of a storage system 100 is illustrated, in accordance with an embodiment. Aspects of storage system 100, other systems, networks, apparatus, and processes explained herein can constitute machine-executable instructions embodied within machine(s), e.g., embodied in one or more computer readable mediums associated with one or more machines. Such instructions, when executed by the one or more machines, e.g., computer(s), computing device(s), virtual machine(s), etc. can cause the machine(s) to perform the operations described. Additionally, the systems and processes explained herein can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Storage system 100 includes scope component 110 and resource component 120. Storage system 100 can include various computer-based storage technologies including, e.g., a Small Computer System Interface (SCSI), which is a peripheral, peer-to-peer interface that can be used, e.g., in personal computer (PC) server systems; a Serial Storage Architecture (SSA); a SCSI-over-Fiber Channel Protocol; Serial Attached SCSI (SAS); an Internet SCSI (iSCSI), which is an Internet Protocol (IP) based storage networking standard for linking data storage facilities and/or entities; virtual storage, e.g., associated with virtual machines of a cloud computing system; at least one solid state disk (SSD) device; etc.

In an aspect, storage system 100 can employ SCSI device(s), Serial Advanced Technology Attachment (SATA) device(s), SAS device(s), and/or SSD device(s). In another aspect, storage system 100 can employ such devices and/or virtual disk devices, e.g., utilizing iSCSI, Fibre Channel, SCSI-over-Fiber Channel, SSA, other Storage Area Network (SAN) protocol(s), etc. In yet another aspect, storage system 100 can expose, interface, and/or connect with storage volume(s) of a SAN via front-end port(s), e.g., Ethernet port(s), physical disk(s), virtual disk(s), etc., for example, via a SATA computer bus, via a SAS interface, etc. In one aspect, storage system 100 can import, e.g., inherit, storage from other storage systems and/or replication appliances and/or devices.

For example, iSCSI can be used to transmit data over local area networks (LANs), wide area networks (WANs), and/or the Internet; and can enable location-independent data storage and retrieval. Under iSCSI protocol, clients (or initiators), can send SCSI commands to SCSI storage devices (or targets) located on remote servers. As such, iSCSI can be used to consolidate computer storage into data center storage arrays, while enabling, for example, host(s), database server(s), web server(s), computational server(s), resource group(s), host group(s), quota(s), storage tier(s), etc. to appear as locally-attached resources, e.g., acting as virtual machines within a cloud computing system. Further, iSCSI protocol utilizes Transmission Control Protocol (TCP)/IP protocol to create a storage network, in which hosts can access disk or storage volumes included in storage arrays. Under iSCSI protocol, a port, or iSCSI port, can be an application-specific or process-specific software construct serving as a communications endpoint, e.g., via TCP/IP protocol, and is identified by a port identifier, an IP address, and an associated communications protocol. In one aspect, the iSCSI port can be a hardware-based communications endpoint identified by the port identifier, the IP address, etc.

In an aspect, scope component 110 can be configured to associate a type of a resource, or object, with at least one operation, e.g., associated with iSCSI protocol(s). For example, the type of the resource can reference object(s) comprising physical and/or logical element(s). The physical element(s) can include Ethernet port(s) and physical disk(s), e.g., hard disk drive(s), optical drive(s), etc. that can connect to host(s), for example, via a SATA computer interface, via a SAS interface, etc. Logical elements can reference storage pool(s), storage volume(s), storage volume group(s), and/or resource group(s). A storage volume can be a virtual disk, logical disk, and/or a logical unit number (LUN), which refers to a device coupled to an iSCSI/SCSI bus. The storage volume can be assigned to one or more hosts, so that the one or more hosts can utilize the storage volume as a disk device. The storage volume can be included in a storage pool including one or more physical disks and/or storage volumes. Moreover, the storage pool can include storage volume(s) from another storage system, e.g., via a storage tier (see below).

For example, a storage pool can be a logical grouping of physical disks combined together using, e.g., a redundant array of inexpensive disks (RAID) technology. In an aspect, the logical grouping of physical disks can be added to the storage pool to increase storage capacity of the storage pool. In another aspect, the storage pool can include a RAID group formed out of one or more physical disks combined via a fault tolerant scheme, e.g., RAID1, RAID5, RAID6, etc. Under the fault tolerant scheme, the storage pool can survive one or more physical disk failures without losing data or interrupting access to storage volume(s) within the storage pool. In yet another aspect, although removing the logical grouping of physical disks from the storage pool can reduce fault tolerance, e.g., by changing from utilizing a RAID6 fault tolerant scheme to utilizing a RAID5 fault tolerant scheme, removing the logical grouping of physical disks from the storage pool can reduce cost(s).

Further, the storage volume can include one or more storage pools, and can be protected by a RAID technology associated with the one or more storage pools. Storage capacity of a storage volume can be increased by affecting storage capacity of one or more storage pools included in the storage volume. For example, physical disks can be added to a storage pool, or contents of existing physical disk space can be deleted from the storage pool to increase storage capacity of the storage pool. A storage volume group can include at least two storage volumes, e.g., so that the at least two storage volumes can be acted on together. For example, the storage volume group can be created when a desktop, server, or virtual machine includes more than one disk to represent an image, or a function, of the machine, e.g., when a virtual machine includes a storage volume with an operating system (OS) boot image and/or database elements, for example, including log, index, and/or data files, e.g., which can each be included on separate storage volumes. In another aspect, the storage volume group can be cloned and/or snapshot to make atomic copies of the storage volume group. In one aspect, the atomic copies of the storage volume group correlates with a snapshot and/or clone being performed at the same point in time across all associated storage volumes of the storage volume group, e.g., critical for data integrity of the storage volume group.

A resource group includes one or more resources, e.g., storage volume(s), host(s), port(s), etc. and can inherit resources from other resource groups, e.g., via an inheritance relationship. For example, by inheriting storage volumes, or shared storage volumes, from other resource groups, the shared storage volumes, e.g., "parents", can be maintained within one central resource group. This can enable administrators to configure and maintain commonly used boot volumes, e.g., associated with operating system(s), computer program(s), etc., so that users can copy images of the boot volumes without installing such resources from scratch onto empty storage volumes. Moreover, such inheritance can prevent users from manipulating the shared storage volumes, e.g., by enabling the users to only perform snapshot and cloning operations on the shared storage volumes.

A snapshot is a space efficient copy of an original storage volume or an other storage medium—completed at a particular time—that refers to blocks of data in the original storage volume or the other storage medium, so that common blocks, e.g., blocks of data that have not changed since a snapshot was completed, do not need to be duplicated, or copied. On the other hand, a non-space-efficient copy, e.g., a clone, can be utilized to duplicate a storage volume into, e.g., another storage pool, or a storage volume of the same storage pool. The clone can increase redundancy within an associated storage system, and can be used to backup information of a storage volume, for example, so that the information can be migrated and/or directly transferred to, e.g., a tape device, a virtual tape device, etc. that is directly attached to the associated storage system, or that is attached to the associated storage system via a SAN.

Figure 2:
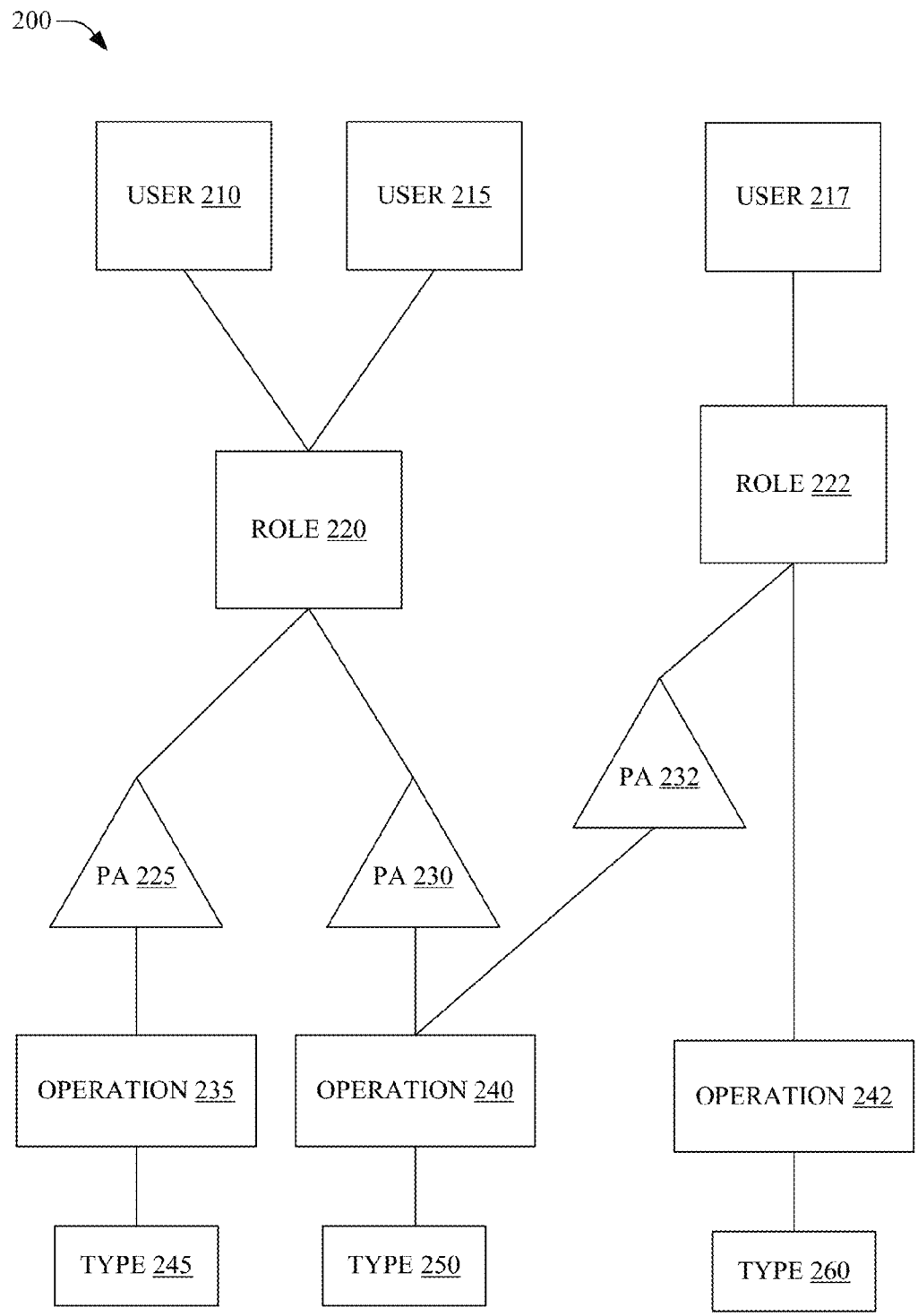
FIG. 2 illustrates a block diagram associated with a storage system, in accordance with an embodiment.

Referring now to FIGS. 1 and 2, a scope component 110 can be configured to associate one or more types of resources with at least one operation. Further, scope component 110 can be configured to assign at least one scoped permission assignment to the at least one operation. In one aspect, a scope of a scoped permission assignment references one or more properties of the scoped permission assignment, e.g., the scope can restrict operation(s) a user can perform on the resource associated with the scoped permission assignment. In another aspect, the scoped permission assignment can be a type of bi-directional class, or "association," which can link two class types together, e.g., via software and/or hardware. A resource component 120 can be configured to assign the at least one scoped permission assignment to at least one role; associate the at least one role with one or more users; and permit, or authorize, the one or more users to perform the at least one operation on the one or more types of resources based on, at least in part, the at least one scoped permission assignment.

In an embodiment illustrated by FIG. 2, storage system 200, via scope component 110 and resource component 120, can authorize two users (210 and 215), who are associated with a role 220, to perform operations (235 and 240) on resources associated with types 245 and type 250, based on scoped permission assignments 225 and 230 assigned to role 220. Further, storage system 200, via scope component 110 and resource component 120, can prevent another user (not shown), who is assigned a role (not shown) that is not assigned a scoped permission assignment, from performing modifying operation(s), or any other operation(s), on any resources within storage system 200. In this way, the various systems and methods described herein can avoid accidental and/or intentional data/loss, or unauthorized data access, in a role-based storage system.

In another aspect illustrated by FIG. 2, storage system 200, via scope component 110 and resource component 120, can authorize a user 217, who is assigned a role 222, to perform operation 242 if role 222 is not assigned a scoped permission assignment associated with operation 242. In yet another aspect illustrated by FIG. 2, storage system 200, via scope component 110 and resource component 120, can authorize user 217 to perform operation 240 on resource(s) associated with type 250, based on a scoped permission assignment 232 assigned to role 222 and associated with operation 242.

In an aspect, the type, e.g., 245, 250, 260, etc. of a resource can include: a storage volume type referencing a storage volume; a storage volume group type referencing a storage volume group including at least two storage volumes; a storage volume access control list (ACL) type referencing a storage volume ACL defining one or more authorization privileges associated with at least one of the storage volume or the storage volume group; a storage pool type referencing a storage pool including at least one of two or more storage volumes or one or more storage volume groups; a storage system type referencing a storage system; a target port type referencing a target port; a physical disk type referencing a physical disk; a host type referencing a host; a host group type referencing a host group including at least two hosts; or storage tier type referencing a storage tier (see below).

In another aspect, the type of the resource can include: a task type referencing a task associated with storage system 100; an audit trail type referencing an audit trail, which can enable an administrator to obtain information about transactions, or tasks, attempted and/or committed within storage system 100, e.g., a list of tasks run within a range of dates, or all tasks run on storage system 100; an alert type referencing an alert of one or more alerts generated within storage system 100 e.g., via email, such as a non-error-based alert signaling that storage system 100 is online or an error-based alert signaling low storage (or disk) space; an alert configuration type referencing a configuration of the alert, e.g., the configuration can set alert thresholds associated with storage pool capacity, low storage pool disk space, etc.; a license type referencing a license, e.g., associated with a license key applied to storage system 100 to enable utilization of storage system 100; a localization type referencing a localization, or preference of language type, of messages produced by storage system 100; an event type referencing an event associated with a change of storage system 100, e.g., when a storage volume is modified, e.g., added, updated, removed, etc. by a user of storage system 100, an event associated with such a modification can be reported, for example, to enable updates on a client-side storage cache affected by the modification.

Further, the type of the resource can include: a custom application programming interface (API) type referencing a custom API associated with storage system 100, e.g., while operations performed within storage system 100 can be associated with an API, such as for creating and/or deleting a storage volume, a custom API can be associated with other operations; a custom object property type referencing a custom object property, e.g., associated with objects such as storage volumes, pools, users, roles, etc. of storage system 100, for example, including information about such objects outside of the scope of storage system 100; a user type including a user reference referencing a user of system 100; a user group type including a user group reference referencing a user group including at least two users; a role type referencing a role; a resource type referencing a resource, or object, of system 100; a resource group type including a resource group reference referencing a resource group including two or more resources; and a quota type referencing a quota object that can refer to a storage pool or a storage tier, e.g., associated with a resource group, which can limit an amount of disk and/or storage space of the storage pool and/or the storage tier (see below) that a user can utilize, e.g., as a resource of a resource group associated with the user. In another aspect, the resource group can include one or more quota objects (see above).

In yet another aspect, the operation, e.g., 235, 240, 242, etc. can include modifying a resource, or object, of storage system 100, utilizing the resource, and or viewing the resource. As indicated above, the resource can include at least one of: a storage volume; a storage volume group; a storage volume ACL; a storage pool; a storage system; a target port; a physical disk; a host; a host group; a task associated with storage system 100; an audit trail; an alert, e.g., regarding equipment failure, generated within storage system 100; an alert configuration; a license; a localization of messages produced by storage system 100; an event associated with a change of storage system 100; a custom API; a custom object property; a user of system 100; a user group; a role; a resource, or object, of system 100; a resource group; or a quota associated with system 100.

In yet another aspect, an alert generated within storage system 100 can relate to specific resources. For example, when a storage volume of a storage pool of storage system 100 is "thin provisioned," "sparsely allocated," and/or includes a low amount of available and/or free storage space, storage system 100 can automatically alert one or more users that the storage volume and/or the storage pool have a critically low amount of available and/or free storage space. In another aspect, storage system 100 can alert the one or more users only if the one or more users are associated, or utilize, the storage volume and/or the storage pool, e.g., based on a scoped permission assignment assigned to a role associated with an operation, e.g., an enumerate alerts operation.

In one aspect, modifying the resource, e.g., via scope component 110, can include at least one of: modifying the storage volume, e.g., renaming and/or changing a description of the storage volume; deleting the storage volume, e.g., releasing disk space of the storage volume back to a storage pool that included the storage volume; resizing the storage volume, e.g., when a user runs out of disk space on an actively used storage volume; creating a snapshot of the storage volume; cloning the storage volume; mirroring the storage volume, e.g., making a copy of the storage volume and retaining a log of differences between the copy and the mirror; replicating the storage volume from a remote location, e.g., remote replicating the storage volume; locking the storage volume, e.g., temporarily preventing creation of snapshots or clones of the storage volume, for example, when maintenance is performed on the storage volume; restoring the storage volume, e.g., restoring contents of a storage volume associated with a time that a snapshot of the storage volume was taken; unlocking the storage volume; compressing the storage volume; or encrypting the storage volume.

Further, modifying the resource, e.g., via scope component 110, can include at least one of: modifying the storage volume group, e.g., renaming the storage volume group and/or changing a description of the storage volume group; adding one or more storage volumes to the storage volume group; removing, or deleting, the storage volume group; removing the one or more storage volumes from the storage volume group; enabling access to a storage volume associated with the storage volume ACL from a specified host, e.g., via iSCSI target port(s); removing the access; modifying the storage pool, e.g., changing a name and/or description of the storage pool; creating the storage pool, e.g., by entering a name of the storage pool, a list of physical disks included in the storage pool, and selecting a fault tolerant RAID type for the storage pool; deleting the storage pool and all storage volumes contained within the storage pool; growing the storage pool, e.g., increasing storage capacity of the storage pool, e.g., via additional storage volumes; "deduplicating" the storage pool, e.g., removing common and/or duplicate blocks from the storage pool, for example, across all storage volume(s) of the storage pool, regardless of whether such storage volume(s) are snapshots of other storage volume(s); or rescanning the storage pool, e.g., scanning storage system 100 for new storage pools and automatically activating the new storage pools, e.g., when one or more physical disks are added to storage system 100.

Moreover, modifying the resource, e.g., via scope component 110, can include at least one of: growing the storage pool, e.g., adding a physical disk to a storage pool, in which data of the storage pool is evenly spread out (or located across) all physical disks (new and old) of the storage pool; adding a hotspare to the storage pool, e.g., correcting a failure of a physical disk within a fault tolerant storage pool by replacing the physical disk with a standby hotspare physical disk; removing the hotspare from the storage pool; changing a status of the storage pool to an online status; changing the status of the storage pool to an offline status, e.g., to perform maintenance on the storage pool; modifying the storage system, e.g., changing a name and/or description of storage system 100; setting one or more parameters associated with the target port; adding a host into storage system 100, e.g., by creating a host object in storage system 100 utilizing an iSCSI Qualified Name (IQN) of the host's iSCSI initiator (or client), so that storage volumes can be assigned to the host utilizing storage volume ACL add and remove operations (see above); removing the host from storage system 100; modifying the host, e.g., changing a name and/or description of the host; adding an initiator port entry to the host, e.g., as an IP address or IQN; or removing the initiator port entry from the host; or creating the host group; modifying the host group, e.g., changing a name and/or description of the host group; deleting the host group; adding a host to the host group; or removing the host from the host group.

In another aspect, modifying the resource, e.g., via scope component 110, can include at least one of: clearing the task, e.g., from a task list, or canceling the task; clearing the audit trail; setting the alert configuration, e.g., setting alert thresholds for storage pool capacity, setting email addresses alerts are directed to; clearing the; setting the license, e.g., applying a license key associated with a purchased license within storage system 100; activating the license, e.g., via an activation code; invoking the custom API; getting, or obtaining information about, the custom object property; setting the custom object property; enumerating the custom object property, which returns a list of custom properties that have been assigned, or set, on an associated object, or resource; modifying the user reference, e.g., renaming the user reference and/or modifying a role assigned to the user reference; deleting the user reference, or setting a password associated with the user reference.

In addition, modifying the resource, e.g., via scope component 110, can include at least one of: creating the user group reference, modifying the user group reference, e.g., renaming and/or changing a description of the user group reference; deleting the user group reference; adding at least one user reference to or associating the at least one user reference with the user group reference; removing or disassociating the at least one user reference from the user group reference; creating the role; modifying the role, e.g., renaming and/or changing the description of the role; deleting the role; adding a permission to the role or associating the permission with the role; removing or disassociating the permission from the role; setting a shared resource flag, which sets a resource of a resource group as "shared," so that users of the resource group can utilize the resource—if the resource is not shared, then only administrators and an owner of the resource can utilize the resource; setting an immutable resource flag, which sets the resource of the resource group as "immutable," so that users of the resource group cannot modify the resource; or setting a global resource flag, which sets the resource of the resource group as "global," so that users of the resource group and a "resource group administrator" cannot modify the resource.

Further, modifying the resource, e.g., via scope component 110, can include at least one of: creating the resource group reference; deleting the resource group reference; adding the user to the resource group, or associating the user with the resource group reference; removing the user from the resource group, or disassociating the user from the resource group reference; adding a resource, e.g., storage volume, storage pool, quota, host, etc. to a resource group or associating the resource with the resource group reference; deleting the resource from the resource group or disassociating the resource from the resource group reference; creating the quota, e.g., on a storage pool or a storage tier that can be assigned as a resource of a resource group; deleting the quota; increasing a size of the quote, e.g., to allow for additional provisioning of storage space from the storage pool or the storage tier; or decreasing the quota, which limits disk space members of the resource group can provision.

In another aspect, utilizing the resource, e.g., via scope component 110, can include at least one of: creating the storage volume, e.g., out of a storage pool or storage tier; resizing the storage volume, e.g., when a user runs out of disk space on an actively used storage volume; creating the snapshot of the storage volume; deleting the snapshot of the storage volume; cloning the storage volume; creating the storage volume group; enabling access to the storage volume associated with the storage volume ACL from the specified host, e.g., via iSCSI target port(s); removing the access; creating the user reference; modifying the user reference, e.g., renaming and/or changing a description of the user reference; or deleting the user reference.

In yet another aspect, viewing the resource, e.g., via scope component 110, can include at least one of: enumerating, or viewing, the storage volume, which returns a list of all storage volumes; enumerating the storage volume group, which returns a list of all storage volume groups; enumerating the storage volume ACL, which returns a list of all storage volume access control lists (ACLs); enumerating the storage pool, which returns a list of all storage pools; enumerating the target port, which returns a list of all target ports in storage system 100, e.g., a list of Ethernet ports that host-side iSCSI initiators can log into; enumerating the physical disk, which returns a list of all physical disks in storage system 100; enumerating the host, which returns a list of all hosts in storage system 100; enumerating the host group, which returns a list of all host groups in storage system 100; viewing active iSCSI sessions and associated connections of each of the iSCSI sessions, which can, for example, indicate hosts logged into a related storage system—and storage volumes, or iSCSI targets, which are connected to the hosts.

In addition, viewing the resource, e.g., via scope component 110, can include at least one of: enumerating the task, which returns a list of all queued, actively running and/or completed tasks of storage system 100; enumerating the alert, which returns a list of all alerts generated by storage system 100; enumerating the event, which returns a list of events associated with changes to storage system 100; enumerating the user reference, which returns a list of all user references, e.g., associated with all users of storage system 100; enumerating the user group reference, which returns a list of all users associated with the user group; enumerating the role, which returns a list of all roles associated with storage system 100; enumerating the resource group, which returns a list of all resource groups for which a requesting user can view; or enumerating the quota, which returns a list of all quotas created within storage system 100.

Figure 3:
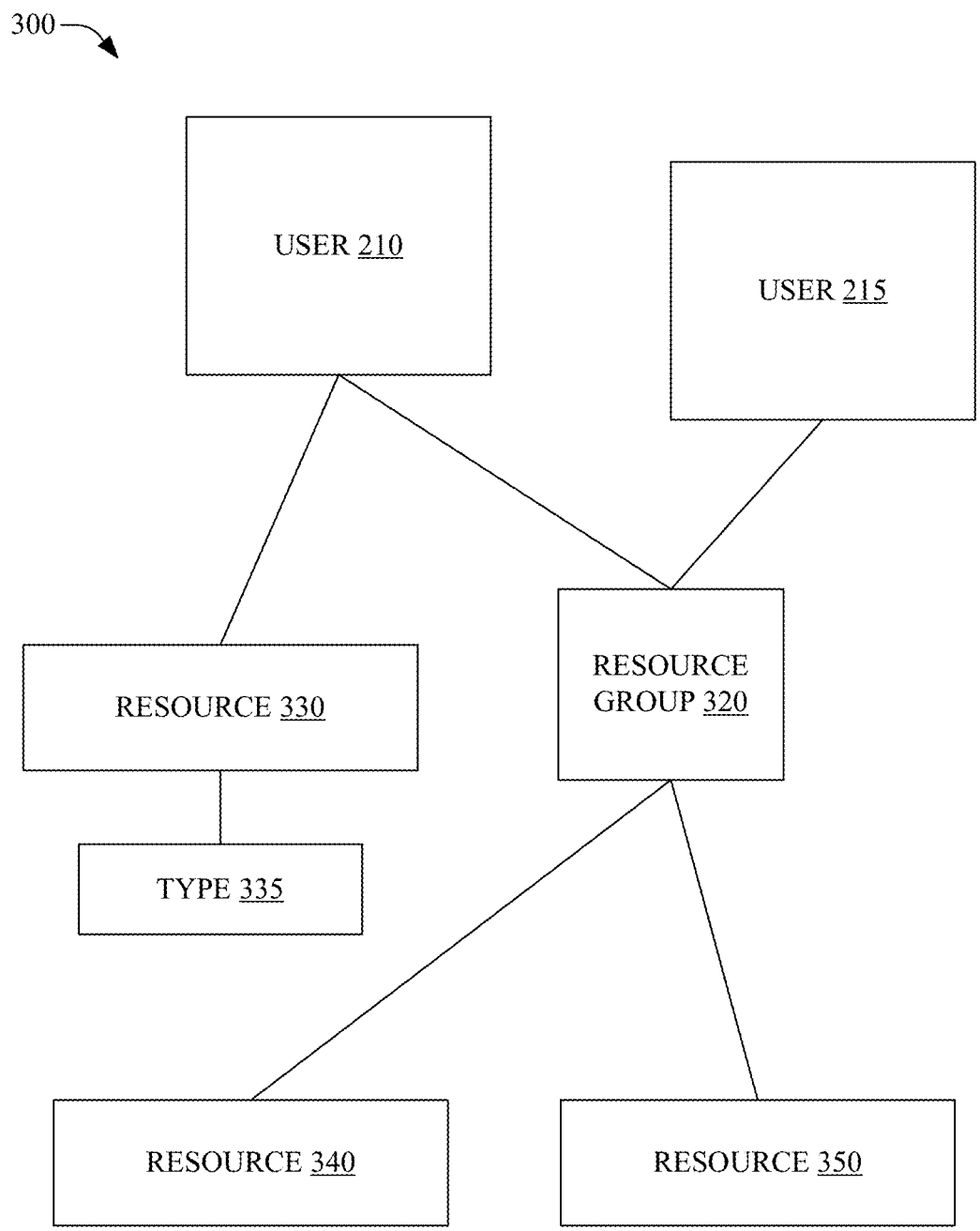
FIG. 3 illustrates another block diagram associated with a storage system, in accordance with an embodiment.

In the embodiment illustrated by FIG. 2, the scoped permission assignment, e.g., 225, 230, 232, etc. associated with the operation, e.g., 235, 240, etc. and assigned to the role, e.g., 220, 222, etc. can include an owner-level permission scope, a group-level permission scope, a system-global-level permission scope, or a grid-level permission scope. As described below, the grid-level permission scope can be associated with resources included in storage tier(s) of a storage grid. In another aspect, the group-level permission scope can be associated with resources included in a resource group; and the system-global-level permission scope can be associated with resources within the resource group and outside of the resource group. Accordingly, in an aspect illustrated by FIG. 3, resource component 120 of storage system 300 can be configured to authorize user 210—who is not associated with resource group 320—to perform modify operations, or any other operations, on any resources within storage system 200, e.g., resources 330 (not associated with a resource group) and resources 340 and 350, if user 210 is assigned a role that is assigned a scoped permission assignment of the system-global-level permission scope.

For example, user 210 can be a "super-administrator" of storage system 200, who has unlimited access/management privileges of all resources of storage system 200; while user 215—who can be associated with resource group 320—can be granted local "administrative rights"/permissions, e.g., rights to access resources 340 and 350 of resource group 320. In this way, compared to conventional technology, resource administrative tasks of resources associated with a resource group, e.g., storage volume management, snapshot and/or clone operations, etc. can be delegated to users associated with the resource group—easing management inefficiencies of conventional techniques that assign storage administrative roles to a limited number of skilled personnel.

In another aspect, resource component 120 can authorize user 210, who can be assigned a role that is assigned a scoped permission assignment, e.g., of an owner-level permission scope—the scoped permission assignment associated with a modify operation—to modify resource 330 if user 210 is designated as an owner of resource 330. In yet another aspect illustrated by FIG. 3, resource component 120 can be configured to authorize user 215 to modify resources 340 and 350 of resource group 320 if user 215 is (1) associated with resource group 320 and (2) assigned a role that is assigned a scoped permission assignment of the group-level permission scope—regardless of whether user 215 is designated ownership of resources 340 and/or 350. In one aspect (not shown), resource component 120 can be configured to authorize modification of a resource (not shown) by user 215 if user 215 is designated owner of the resource and assigned a role that is assigned a scoped permission assignment of the owner-level permission scope.

Figure 4:
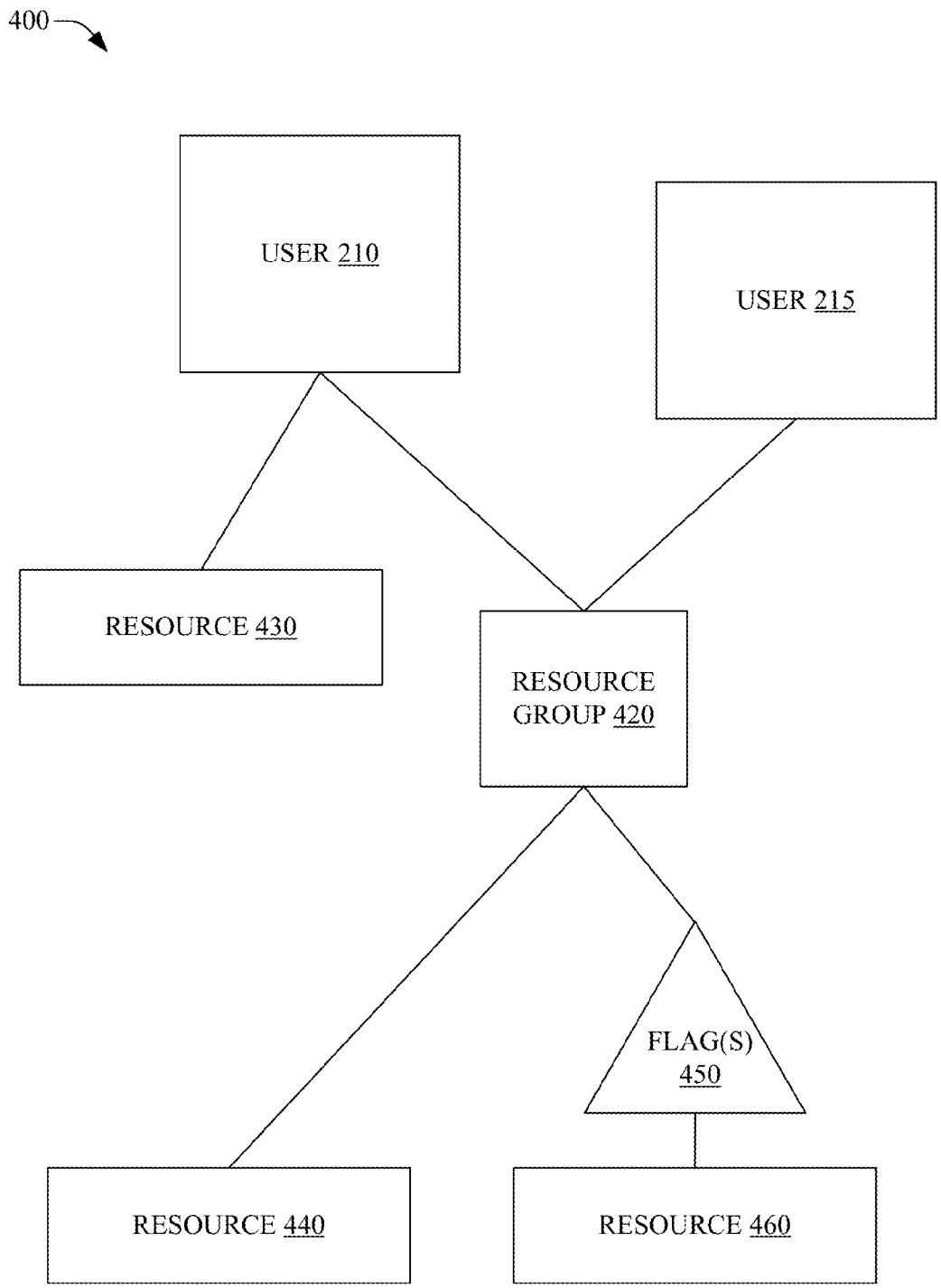
FIG. 4 illustrates yet another block diagram associated with a storage system, in accordance with an embodiment.

FIG. 4 illustrates a storage system 400 in which one or more resource flags, e.g., 450, can be assigned to a resource, according to an embodiment. As illustrated by FIG. 4, scope component 110 can be configured to assign one or more resource flags 450 to resource 460 of resource group 420. Further, resource component 120 can be configured to authorize, or permit, user 215 (who is associated with resource group 420) to perform an operation (not shown) on resource 460, based on, at least in part, one or more resource flags 450, and a scoped permission assignment, e.g., 225, 230, 232, etc. assigned to a role, e.g., 220, 222, etc. that is associated with the user—the scoped permission assignment also associated with the operation, e.g., 235, 240, 242, etc.

In an aspect, one or more resource flags 450 can include at least one of a shared resource flag, an immutable resource flag, or a global resource flag. Further, resource component 120 can be configured to authorize the modifying, the utilizing, and the viewing operations (see above) based on, at least in part, one or more resource flags 450 and a permission scope associated with the modifying, the utilizing, and/or the viewing operations. For example, in an aspect, resource component 120 can be configured to authorize user 215 to perform the modifying operations (see above) on resource 460 if one or more resource flags 450 do not include the immutable resource flag or the global resource flag, and user 215 is associated with a role that is assigned a scoped permission assignment of the group-level permission scope—the scoped permission assignment is also associated with the modifying operations.

In another aspect, resource component 120 can be configured to authorize user 215 to perform the utilizing operations (see above) on resource 460 if one or more resource flags 450 includes the shared resource flag, and user 215 is associated with a role that is assigned a scoped permission assignment of the owner-level permission scope, regardless of whether user 215 is the owner of resource 460. In yet another aspect, resource component 120 can be configured to authorize user 215, regardless of whether user 215 is the owner of resource 460, to perform the utilizing operations on resource 460 if: (1) one or more resource flags 450 includes the immutable resource flag; and (2) user 215 is associated with a role that is assigned a scoped permission assignment of the owner-level permission scope or the group-level permission scope. In an aspect, resource component 120 can be configured to authorize user 215, regardless of whether user 215 is the owner of resource 460, to perform the utilizing operations on resource 460 if: (1) one or more resource flags 450 includes the shared resource flag and the global resource flag; and (2) user 215 is assigned a role that is assigned a scoped permission assignment of the owner-level permission scope or the group-level permission scope.

In yet another aspect, resource component 120 can be configured to authorize user 215, regardless of whether user 215 is the owner of resource 460, to perform the utilizing operations on resource 460 if: (1) one or more resource flags 450 includes the shared resource flag and the immutable resource flag; and (2) user 215 is assigned a role that is assigned a scoped permission assignment of the owner-level permission scope or the group-level permission scope. In yet another aspect, resource component 120 can be configured to authorize user 215, regardless of whether user 215 is the owner of resource 460, to perform the utilizing operations on resource 460 if: (1) one or more resource flags 450 includes the shared resource flag, the immutable resource flag, and the global resource flag; and (2) user 215 is assigned a role that is assigned a scoped permission assignment of the owner-level permission scope or the group-level permission scope.

In one aspect, resource component 120 can be configured to authorize user 215, regardless of whether user 215 is the owner of resource 460, to perform the utilizing operations on resource 460 if: (1) one or more resource flags 450 includes the immutable resource flag and the global resource flag; and (2) user 215 is assigned a role that is assigned a scoped permission assignment of the group-level permission scope. Further, resource component 120 can prevent user 215 from performing the modifying, the utilizing, or the viewing operations on resource 460 if: (1) one or more resource flags 450 includes the immutable resource flag and the global resource flag; and (2) user 215 is assigned a role that is assigned a scoped permission assignment of the owner-level permission scope, regardless of whether user 215 is the owner of resource 460.

In an aspect illustrated by FIG. 4, resource component 120 can be configured to authorize user 215 to perform the modifying operations (see above) on resource 440 if no resource flags are associated with resource 440, and user 215 is assigned a role that is assigned a scoped permission assignment of the group-level permission scope or the system-global-level permission scope—regardless of whether user 215 is designated ownership of resource 440. Further, if user 215 is not an owner of resource 440, but is assigned a role that is assigned a scoped permission assignment of the owner-level permission scope, and no resource flags are associated with resource 440, resource component 120 can be configured to authorize user 215 to perform the viewing operations (see above) on resource 440. It should be appreciated that a user (not shown), who is assigned a role that is not associated with an operation correlated with a scoped permission assignment, cannot perform modifying operations on any resources within storage system 400.

Figure 5:
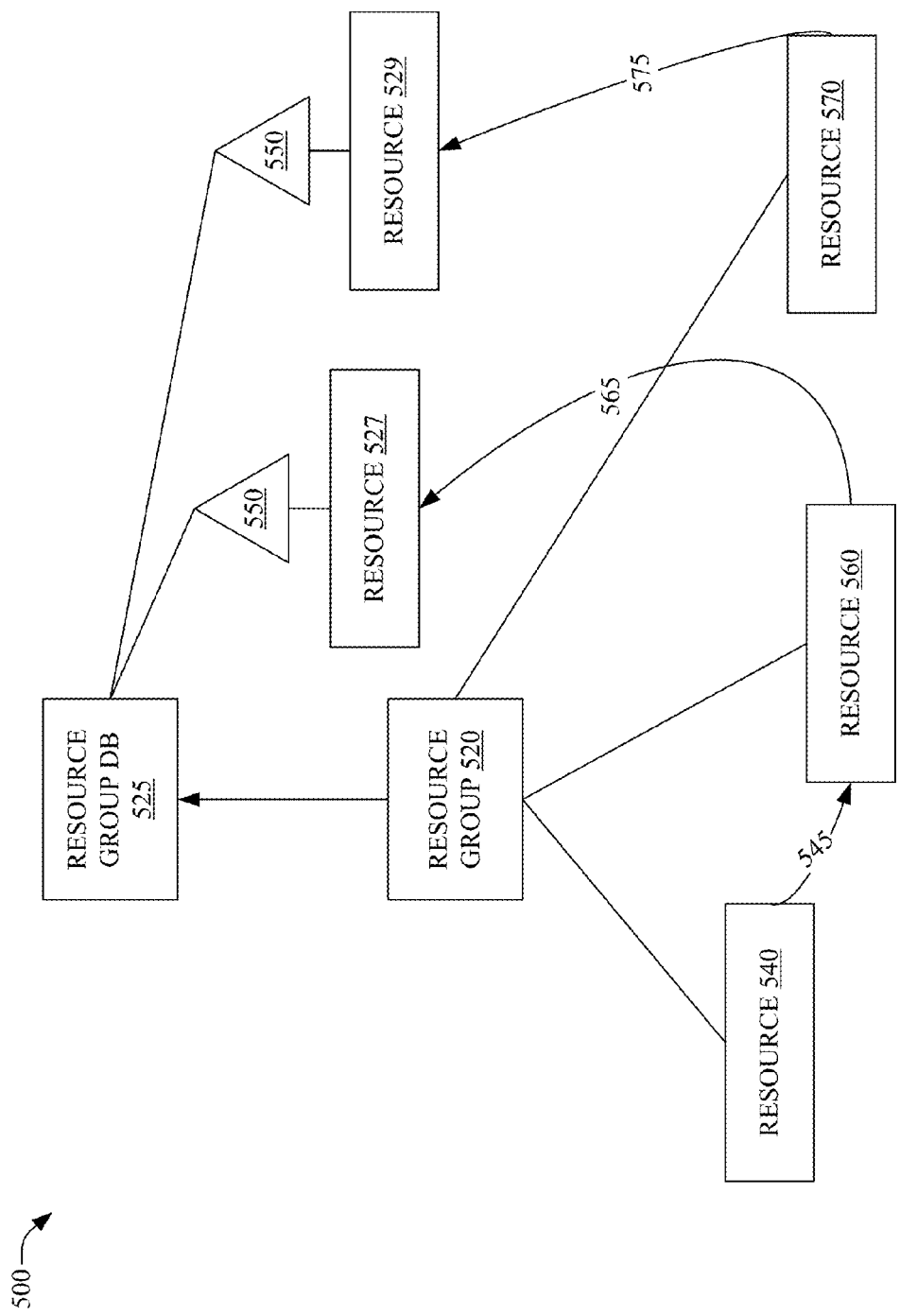
FIG. 5 illustrates resource group inheritance, in accordance with an embodiment.

Now referring to FIG. 5, a storage system 500 including resource group inheritance is illustrated, according to an embodiment. As described above, resources within a resource group can inherit resources from other resource groups. For example, commonly shared resources can include, e.g., storage volumes that are specially configured with a "golden" operating system (OS) "boot image", which can save a storage system user's time and/or resources since the user doesn't have to install the OS, or applications associated with the OS boot image, on an associated resource from scratch. In another example, the shared storage volume can include one or more databases that can be used by more than two users, e.g., who are associated with a resource group, or team. For example, the one or more databases of the shared storage volume can be used by the team for data-mining and/or for research and development (R&D). By placing shared resource(s), e.g., shared storage volume(s), in a resource group that users of a related storage system can inherit from, the shared resource(s) can be shared with the users, for example, via an associated resource group, for example, from which the users performed snapshot or cloning operation(s).

In an aspect, shared resource(s), e.g., storage volume(s) configured with a golden OS boot image, etc. can be maintained within one resource group by, e.g., the super-administrator described above. As illustrated by storage system 500, resource group 520 can inherit resource group 525, which includes shared resources 527 and 529. In one aspect, shared resource 527 can be a boot volume associated with an operating system, and shared resource 529 can included resources associated with a database system. Accordingly, the super-administrator, e.g., who is assigned a role that is assigned a scoped permission assignment of the system-global-level permission scope, can configure and maintain commonly used resources 527 and 529, while one or more users associated with resource group 520 can be permitted to make a copy of at least one of the resources of resource group 525. In this way, storage system 500 can prevent users, e.g., associated with resource group 520, from manipulating shared resources, e.g., storage volumes.

For example, one or more resource flags 550 associated with resources 527 and 529 can include the shared resource flag, the immutable resource flag, and the global resource flag. As described above, resource component 120 can be configured to permit, or authorize, a user—who is assigned a role that is assigned a scoped permission assignment of the owner-level permission scope or the group-level permission scope—to utilize resources 527 and 529. Further, as described above, scope component 110 can enable utilizing a resource including creating a snapshot of a storage volume. Accordingly, as illustrated by FIG. 5, the user can be authorized to create a resource 540, 560, and/or 570 within resource group 520. Further, the user can perform snapshots 565 and 575 of resources 527 and 529, respectively, and associate such snapshots with resources 560 and 570, respectively.

In an aspect, storage system 500 can automatically deposit newly created resource(s), e.g., 540, 560, 570, etc. in a resource group associated with the user, e.g., resource group 520. In an aspect, the user can be a member of at least two resource groups, and the at least two resource groups can utilize the same storage pool. As such, when the user creates a new storage volume from such a pool, it can be ambiguous as to which resource group the storage volume should be deposited. In such a case, for example, storage system 500 can enable the user to set a default resource group or explicitly designate a resource group to deposit the new storage volume into, e.g., via an input related to a create volume operation, a snapshot volume operation, and/or clone volume operation.

Moreover, the user can perform snapshot 545 of resource 560, and associate snapshot 545 with resource 540. In this way, for example, the user can copy images of the boot volume associated with resource 527 onto resources 560 and 540, without installing the boot volume onto resources 540 and 560 from scratch. Further, for example, the user can copy data and/or software associated with the database system of resource 529 onto resource 570, without installing the data and/or the software onto resource 570 from scratch.

Figure 6:
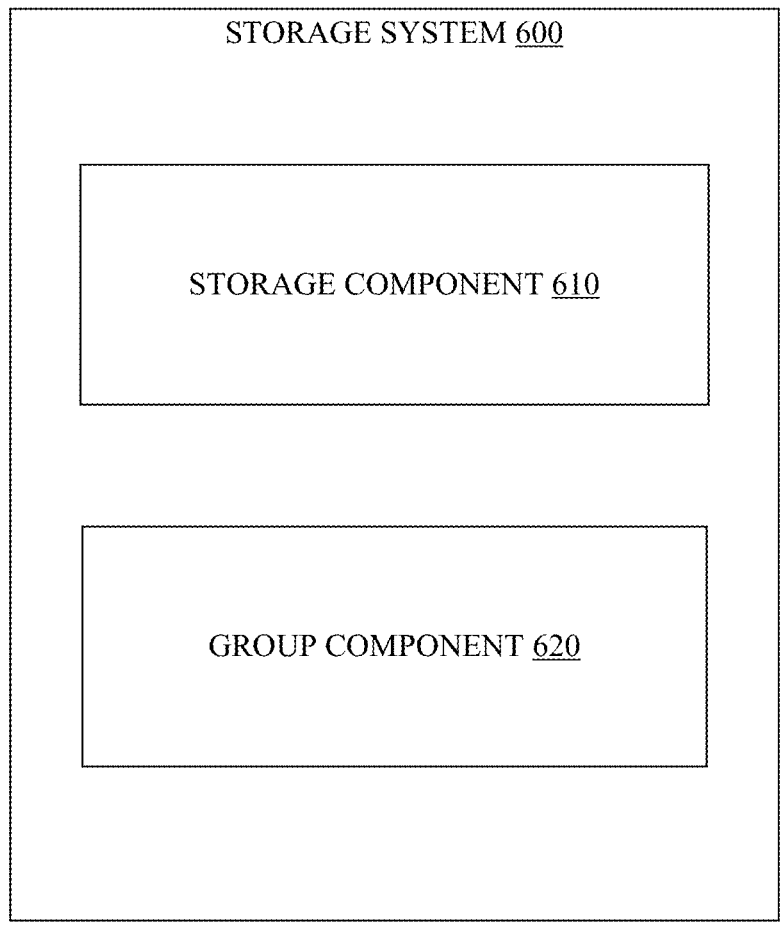
FIG. 6 illustrates a storage system associated with a grid of storage systems, in accordance with an embodiment.
Figure 7:
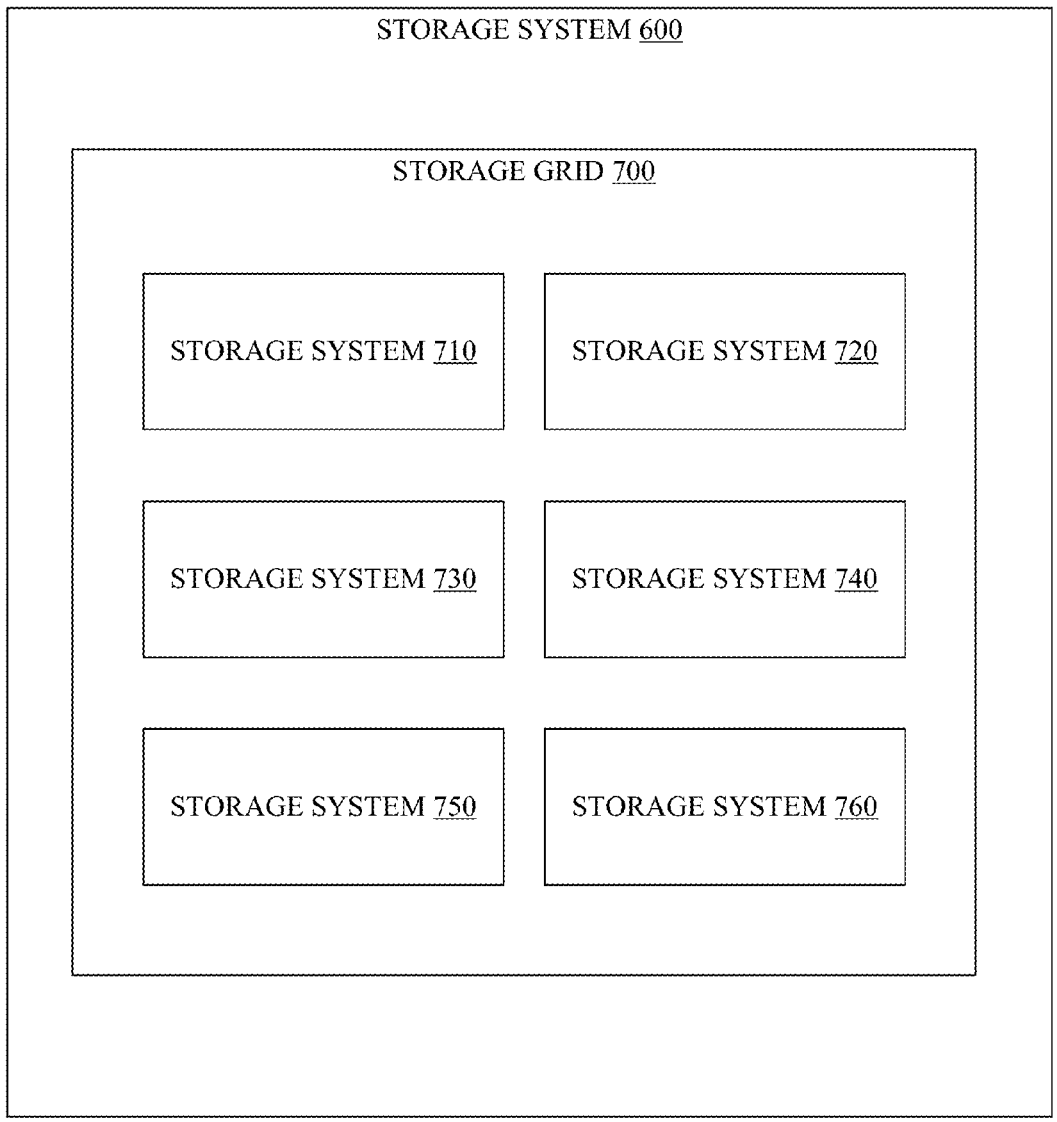
FIG. 7 illustrates a storage grid, in accordance with an embodiment.

Now referring to FIG. 6, a storage system 600 associated with a grid of storage systems (not shown) is illustrated, in accordance with an embodiment. Storage system 600 can include a storage component 610 and a group component 620. Storage component 610 can be configured to create a storage grid including at least two storage systems, e.g., storage systems 100, 200, 300, 400, 500, etc. As illustrated by FIG. 7, storage system 600 can include storage grid 700, which can include storage systems 710, 720, 730, 740, 750, and 760, according to an aspect. It should be appreciated that such storage systems can include one or more embodiments of the systems and methods presented herein.

Figure 8:
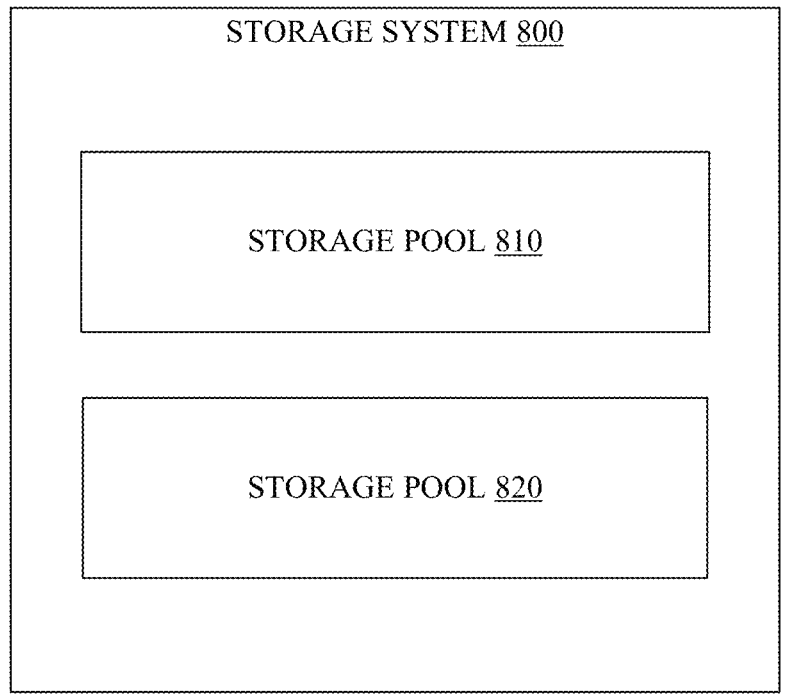
FIG. 8 illustrates a storage system associated with storage pools, in accordance with an embodiment.

FIG. 8 illustrates another storage system (800) that can be included in storage grid 700, in accordance with an embodiment. Storage system 800 can include one or more storage pools, e.g., storage pools 810 and 820. A storage pool of the one or more storage pools can include one or more storage mediums. As further described below, the one or more storage mediums can refer to at least memory components that can include volatile and/or nonvolatile memory.

Figure 9:
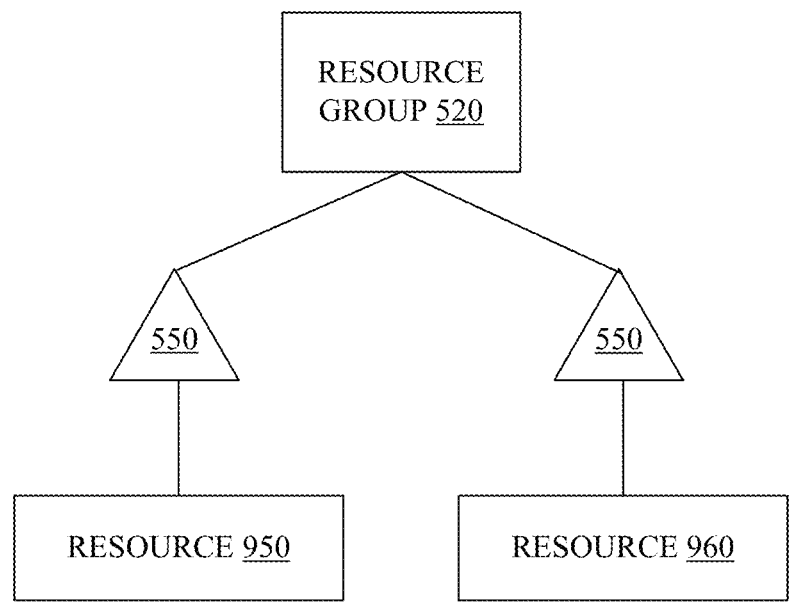
FIG. 9 illustrates storage tiers of a storage grid, in accordance with an embodiment.
Figure 9:
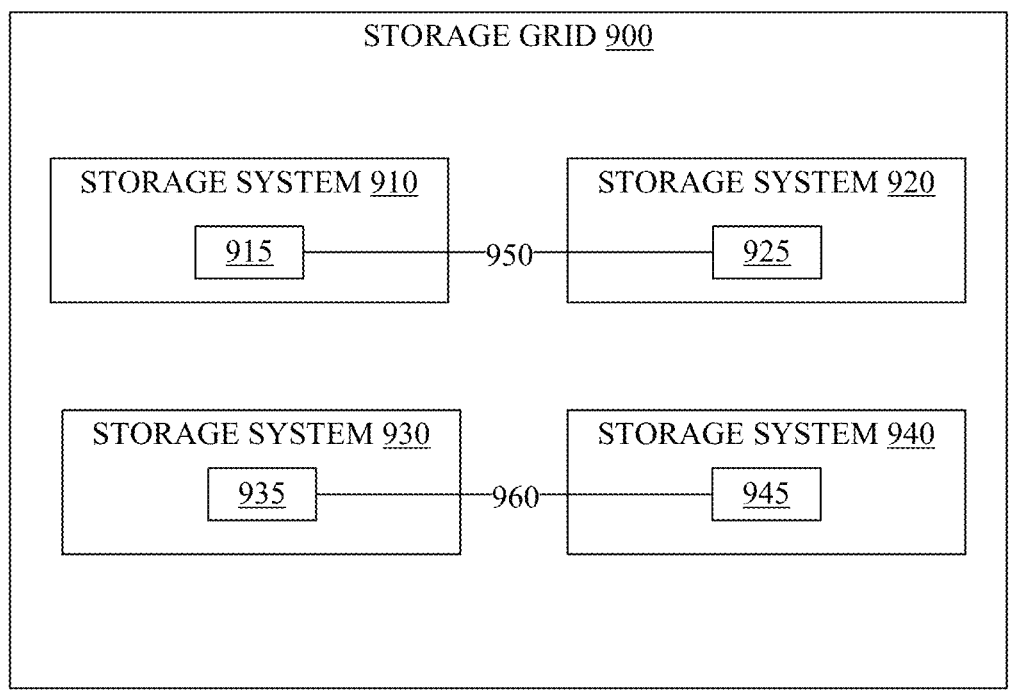

Returning now to FIGS. 6-8, and with respect to storage grid 900 illustrated by FIG. 9, in accordance with an embodiment, group component 620 can be configured to combine storage pools of the one or more storage pools into one or more storage tiers, e.g., storage tier 950, storage tier 960. It should be appreciated that group component 620 can combine storage pools within one storage system, e.g., storage pools 810 and 820 within storage system 800, or within different storage systems, for example, that are located in different geographical areas, e.g., within storage system 710 located, for example in Seattle, Wash., and within storage system 720 located, for example, in Newark, N.J.

As illustrated by FIG. 9, group component 620 can be configured to combine storage pool 915 of storage system 910 with storage pool 925 of storage system 920 to create storage tier 950. Further, group component 620 can be configured to combine storage pool 935 of storage system 930 with storage pool 945 of storage system 940 to create storage tier 960. In an aspect, group component 620 can be configured to assign a storage tier of the one or more storage tiers as a resource of a resource group. As described above, a resource can be an object including, and/or referring to, physical and/or logical elements, e.g., Ethernet ports, physical disks (e.g., hard disk drives, optical drives, etc.), hosts, storage pools, storage volumes, storage volume groups, resource groups, etc. As such, FIG. 9 illustrates group component 620 configured to assign storage tiers 950 and 960 as resources of resource group 520. Accordingly, a user can affect such resources, e.g., via storage systems 100, 200, 300, 400, 500, etc. as described above. For example, a user associated with resource group 520 can be authorized to perform one or more operations on resources 950 and 960 based on, at least in part, one or more resource flags 550 associated with resources 950 and 960.

In one aspect (not shown), group component 620 can be configured to automatically combine the storage pools based on at least one of a storage size of the one or more storage mediums or a utilization rate of the one or more storage mediums. For example, group component 620 can automatically combine storage pools to create larger storage pools when one or more users request larger storage space, or when the one or more users request a particular size of storage medium and/or a certain performance associated with a storage medium. For example, group component 620 can automatically combine storage pools to create larger storage pools, as needed, based on utilization rate(s), e.g., read/write access time, latency, total storage space, etc. associated with storage mediums of the storage pools.

In another aspect, group component 620 can automatically combine storage pools from different storage systems, e.g., for system level fault tolerance. For example, if four storage systems, e.g., S1, S2, S3, and S4, each include three storage pools P1, P2, and P3, such pools can be exported as iSCSI targets to other systems such that, for example, group component 620 can create a storage pool P0, e.g., associated with RAID5, within S1 (storage system one) by combining storage pools P1 from storage systems S2, S3, and S4. In another aspect, group component 620 can create a storage pool P0, e.g., associated with RAID5, within S2 (storage system two), by combining storage pool P2 of S1, P2 of S3, P2 of S4. For example, if any storage system, e.g., S3, fails, group component 620 can enable other system(s) to "take over" (or replace) operation(s) of S3, e.g., enabling an associated storage grid to self heal.

In yet another aspect, each storage system, e.g., S1, S2, S3, S4, etc. of a storage grid can be associated with a hypervisor, such that the hypervisor can serve storage resources to other parts of the grid and consume storage resources from the other parts of the grid, e.g., via virtual machines running within the storage system. For example, storage systems can be added to the storage grid to increase storage and/or server resources, e.g., via migration of virtual machines running within the storage system.

Figure 10:
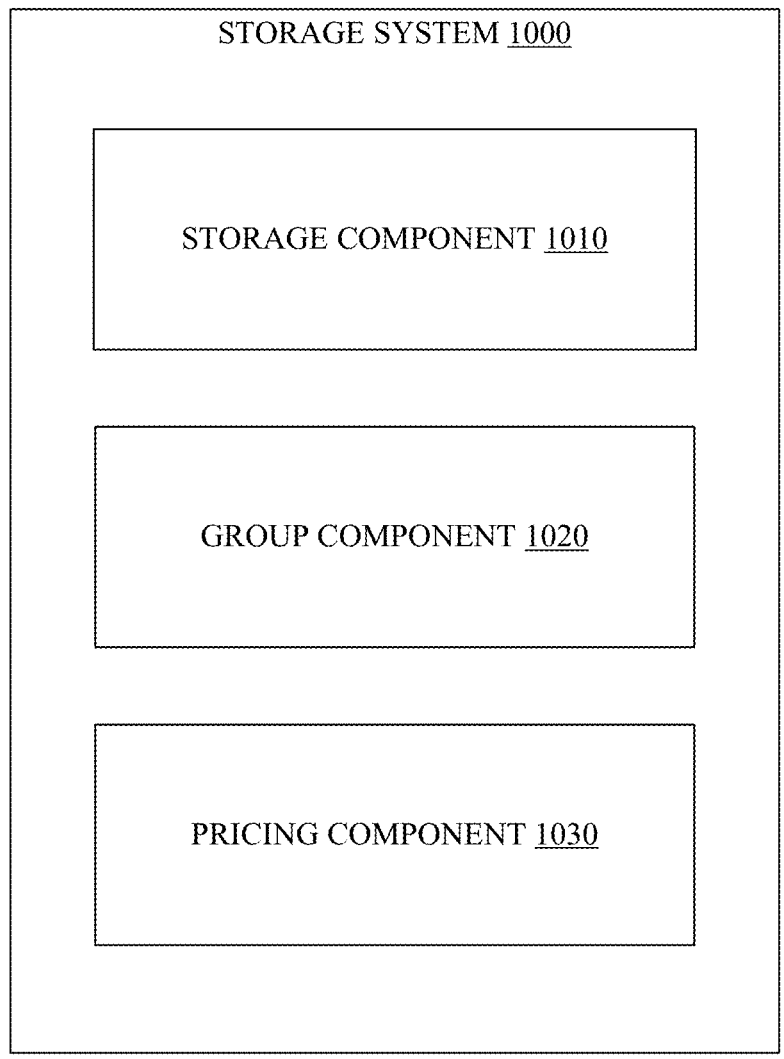
FIG. 10 illustrates a storage system including a pricing component, in accordance with an embodiment.

Referring now to FIG. 10, a storage system 1000 including a pricing component 1030 is illustrated, in accordance with an embodiment. Pricing component 1030 can be configured to assign one or more fees corresponding to the one or more storage tiers based on the at least one of the storage size or the utilization rate. Further, the user can be authorized to perform the operations on the resource based on, at least in part, the fee. For example, pricing component 1030 can assign higher fees to a storage tier, e.g., "gold storage tier," for example, associated with a high input/output (I/O) throughput and fault-tolerance level, e.g., RAID6, RAID10, etc. In another example, pricing component 1030 can assign lower fees to another storage tier, e.g., "silver storage tier," for example, associated with storage pools that have weaker fault-tolerance, e.g., RAID5, no fault tolerance, e.g., RAID0, and/or lower I/O throughput.

In another aspect, pricing component 1030 can assign fees proportional to the total storage size of an associated storage tier. For example, pricing component 1030 can assign a unit price, e.g., price per unit, or size, of memory, based on a level of performance, e.g., access time(s).

Figure 11:
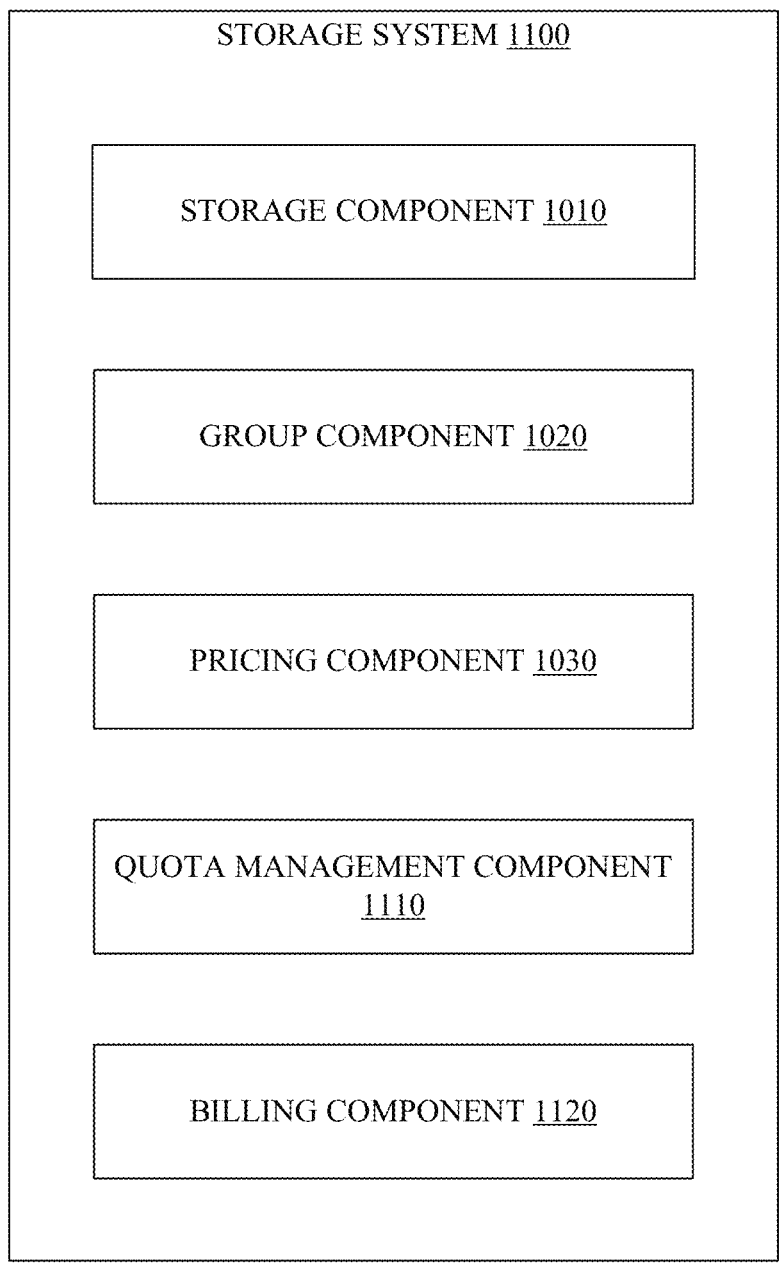
FIG. 11 illustrates a storage system including a quota management component and a billing component, in accordance with an embodiment.

In another aspect illustrated by FIG. 11, a storage system 1100 can include a quota management component 1110 that can automatically identify an amount of cache memory and/or storage resources associated with a user of storage system 1100, e.g., by marking records associated with particular resources, e.g., storage volumes, assigned to the user and scanning such records on a periodic basis. In another aspect, quota management component 1110 can automatically monitor storage utilization, e.g., based on a number of I/O operations (IOPs), total utilized capacity, etc. In one aspect, quota management component 1110 can automatically alert the user, e.g., via email, telephone, etc. that the user may be running out of resources and should consider purchasing and/or reconfiguring resources within storage system 1100. In yet another aspect, storage system 1100 can include a billing component 1120, e.g., coupled to pricing component 1030 and quota management component 1110, which can automatically (1) determine fees accrued by the user and (2) bill such fees to the user on a periodic, e.g., monthly, basis.

Figure 12:
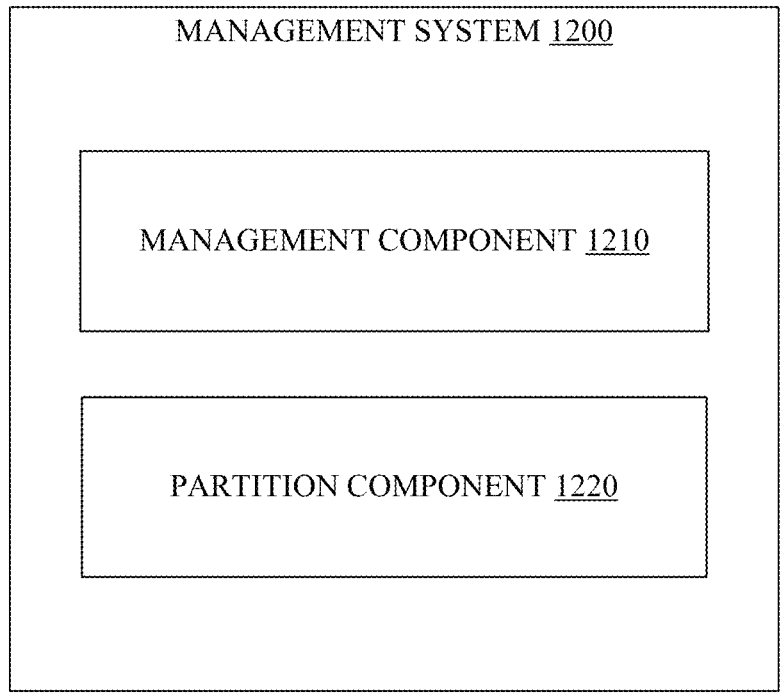
FIG. 12 illustrates a management system, in accordance with an embodiment.

FIG. 12 illustrates a management system 1200, in accordance with an embodiment. Management system 1200 can include a management component 1210 and a partition component 1220. Management component 1210 can be configured to associate a role with one or more system administrators of a storage grid, e.g., storage grid 700. Further, management component 1210 can be configured to assign a permission scope to an operation related to a type of one or more resources of the storage grid, and associate the operation with the role. In an aspect, the permission scope, the operation, and the type of the one or more resources parallel such features described above with respect to storage systems 100, 200, 300, 400, 500, etc.

Partition component 1220 can be configured to partition management of the storage grid via the one or more system administrators based on the permission scope. For example, in one aspect, partition component 1220 can be configured to associate at least one resource of the one or more resources with at least one system administrator of the one or more system administrators. Moreover, partition component 1220 can be configured to authorize the at least one system administrator to perform the operation on the at least one resource based on, at least in part, the permission scope. In this way, management of a storage grid comprising storage tiers, e.g., storage grid 700, can be delegated among system administrators, e.g., located in different locations. For example, such system administrators can maintain physical aspects of associated storage systems, e.g., by replacing failed disks, adding physical disks to grow storage pools that are low on free storage space, etc.

FIGS. 13-26 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 13:
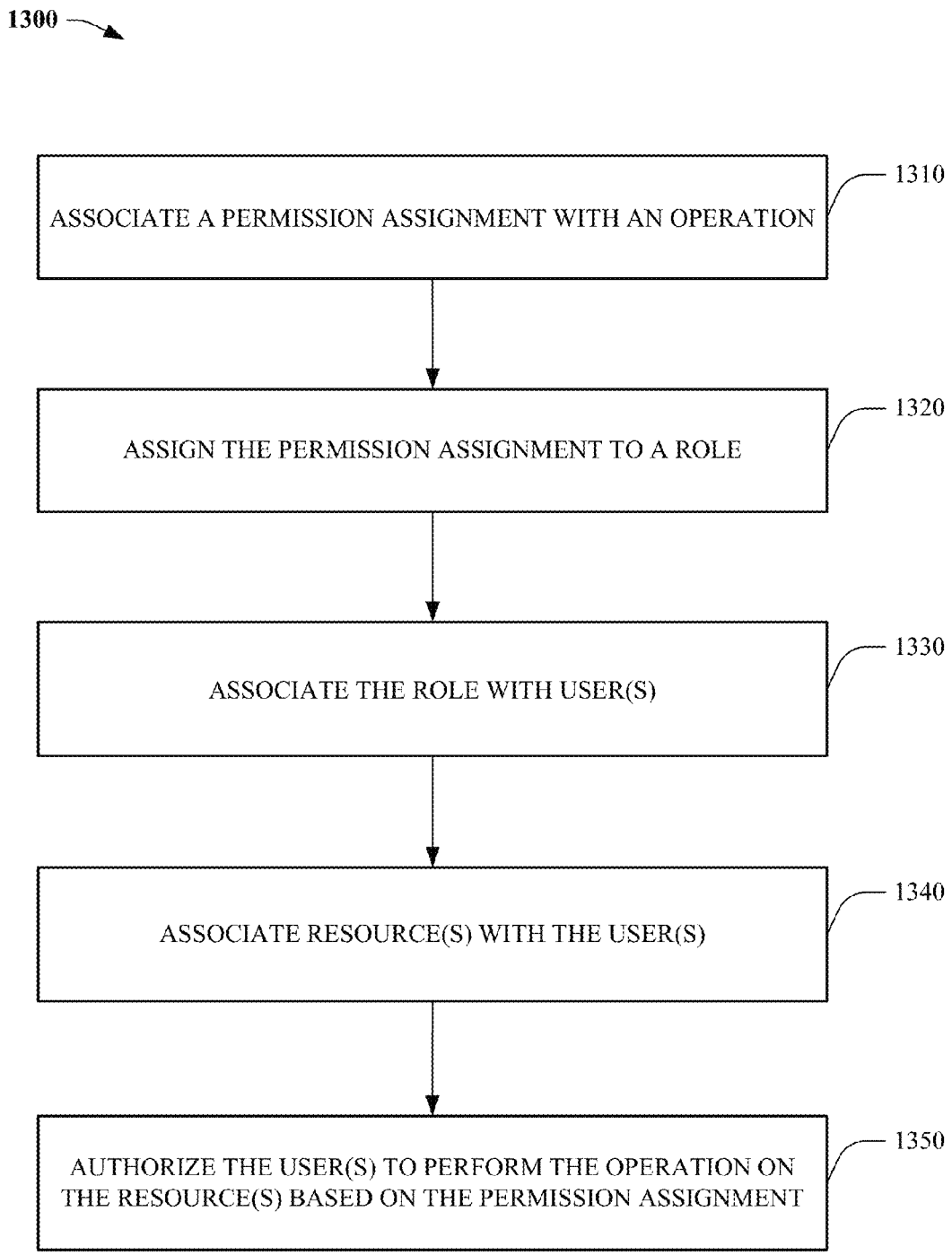
FIGS. 13-26 illustrate various processes associated with one or more storage systems, in accordance with an embodiment.

Referring now to FIG. 13, a process 1300 for authorizing access to storage system resources by scoping operations associated with such resources is illustrated, in accordance with an embodiment. At 1310, a scoped permission assignment can be associated with an operation to be performed within a storage system. The scoped permission assignment can be assigned to a role at 1320; and the role can be associated with one or more users at 1330. At 1340, at least one resource can be associated with the one more users, e.g., via a resource group as described above; and process 1300 can authorize the one or more users, at 1350, to perform the operation on the one or more resources based on, at least in part, the scoped permission assignment.

In an aspect, the scoped permission assignment, the operation, the storage system, the role, and the one or more resources can include scoped permission assignments, operations, storage systems, roles, and resources, respectively, as discussed above with respect to storage systems 200 and 300.

Figure 14:
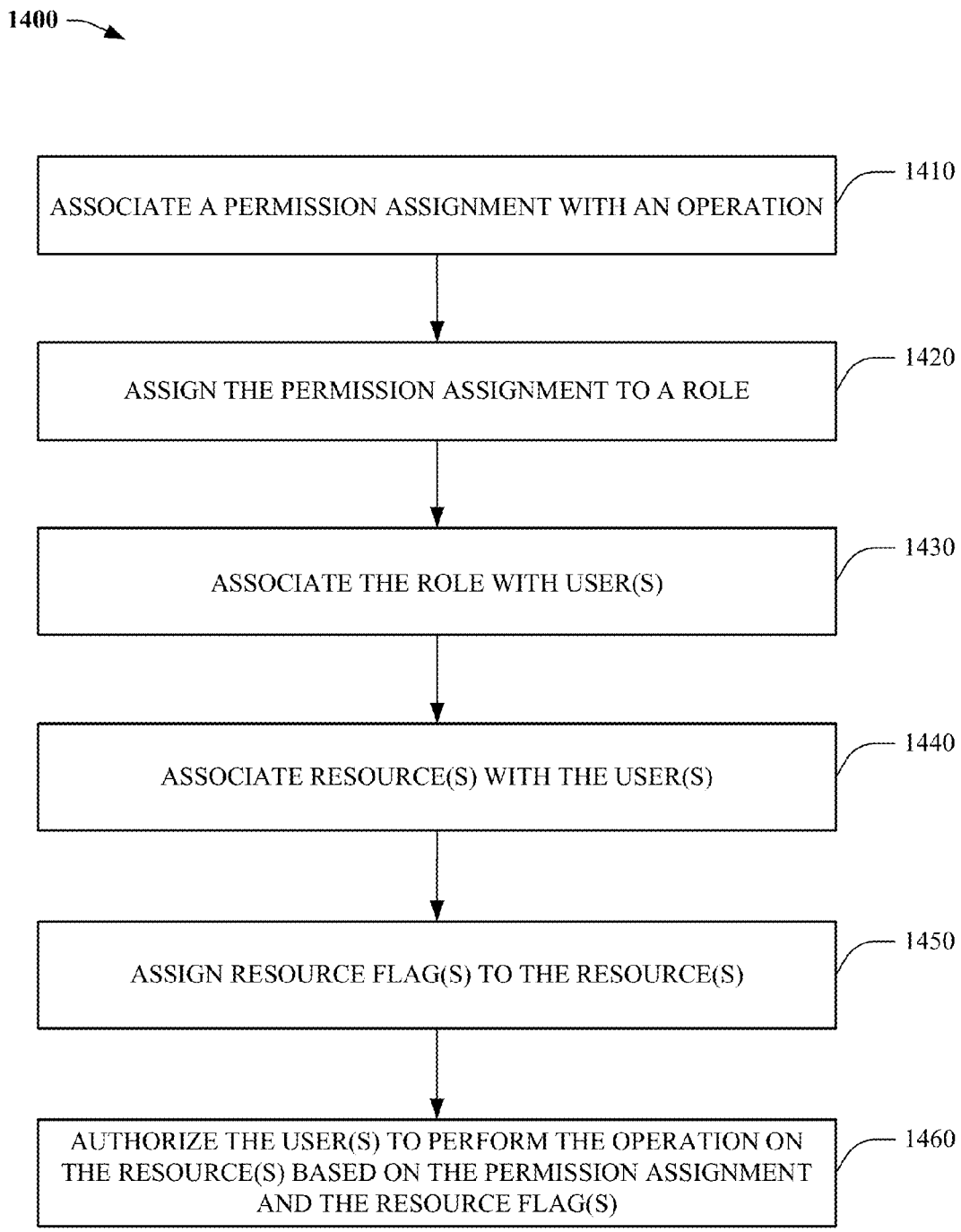

FIG. 14 illustrates a process 1400 for authorizing access to storage system resources by scoping resources and operations associated with such resources, in accordance with an embodiment. At 1410, a scoped permission assignment can be associated with an operation to be performed within a storage system; and the scoped permission assignment can be assigned to a role at 1420. The role can be associated with one or more users at 1430; and at least one resource can be associated with the one more users, e.g., via a resource group as described above, at 1440. At 1450, one or more resource flags can be assigned to the at least one resource. Process 1400 can authorize the one or more users to perform the operation on the at least one resource, at 1460, based on the scoped permission assignment and the one or more resource flags. In an aspect, the scoped permission assignment and the one or more resource flags can include the scoped permission assignment and the one or more resource flags, respectively, as discussed above with respect to storage systems 400 and 500.

Figure 15:
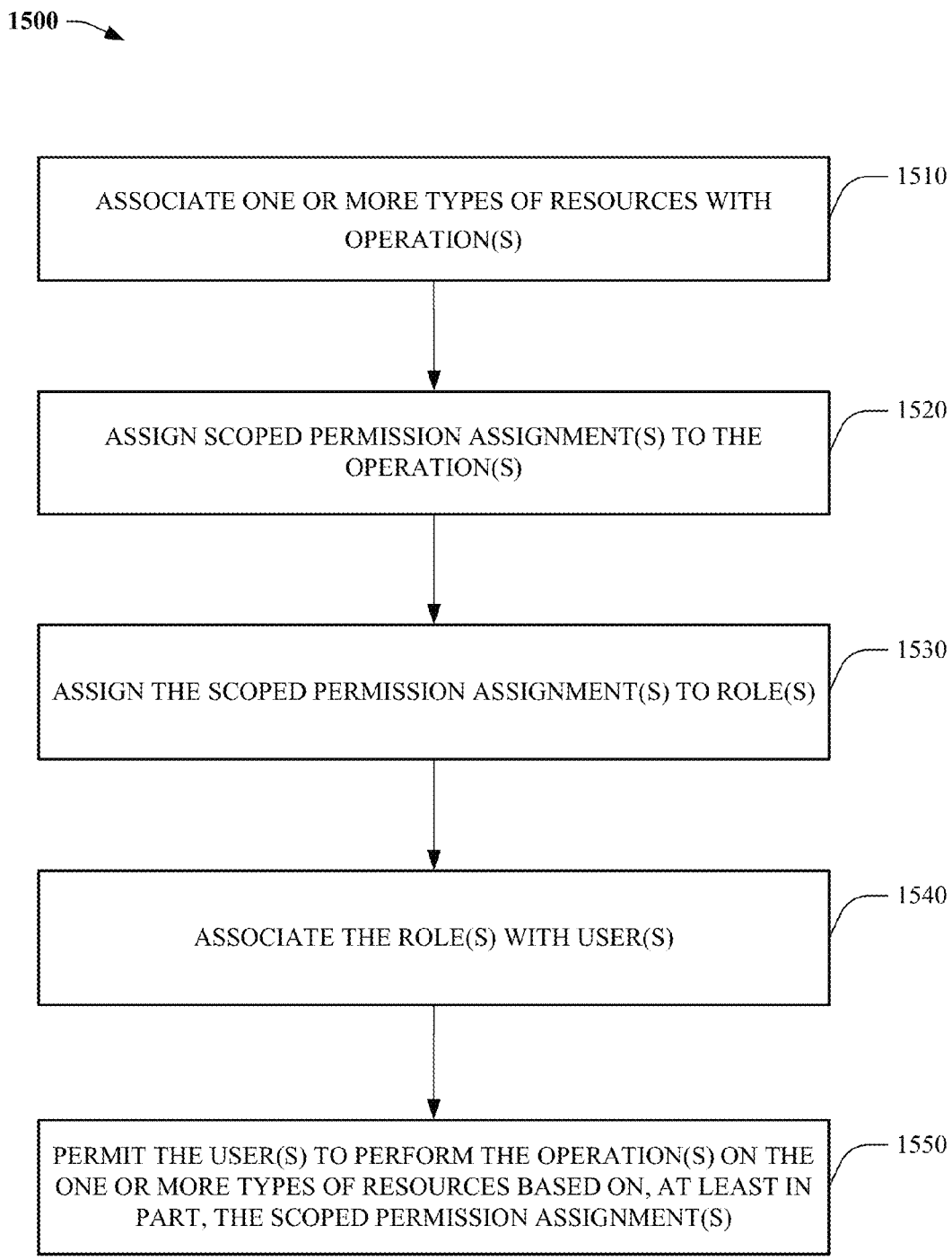

FIG. 15 illustrates another process (1500) for authorizing access to storage system resources by scoping operations associated with such resources, in accordance with an embodiment. At 1510, a one or more types of resources can be associated with one or more operations. For example, the one or more types of resources can include types of resources discussed above with respect to storage system 200; and the one or more operations can include operations discussed above with respect to storage systems 200 and 300. One or more scoped permission assignments can be assigned to the operation(s) at 1520, and assigned to one or more roles at 1530. The role(s) can be associated with user(s) at 1540, and the user(s) can be permitted at 1550 to perform the operation(s) on the one or more types of resources based on, at least in part, the scoped permission assignment(s).

Figure 16:
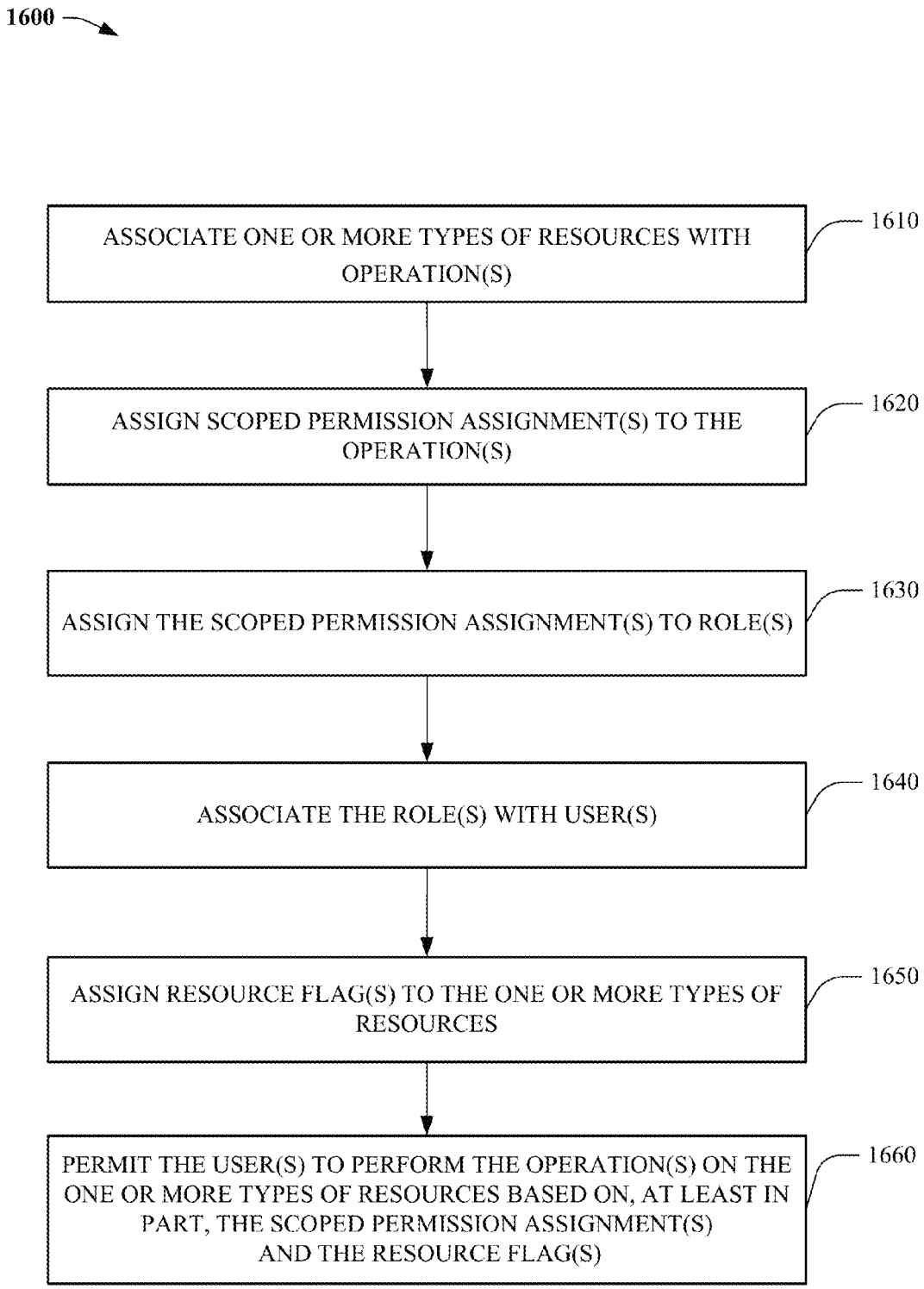

FIG. 16 illustrates another process (1600) for authorizing access to storage system resources by scoping resources and operations associated with such resources, in accordance with an embodiment. At 1610, type(s) of resource(s) can be associated with one or more operations; and scoped permission assignment(s) can be assigned to the one or more operations at 1620, and assigned to role(s) at 1630. The role(s) can be associated with user(s) at 1640. One or more resource flags can be assigned to the one or more types of resources at 1650; and one or more users can be permitted to perform the one or more operations on the one or more types of resources based on, at least in part, the one or more scoped permission assignments and the one or more resource flags. In an aspect, the permission scope and the one or more resource flags can include the permission scope and the one or more resource flags, respectively, as discussed above with respect to storage systems 400 and 500.

Figure 17:
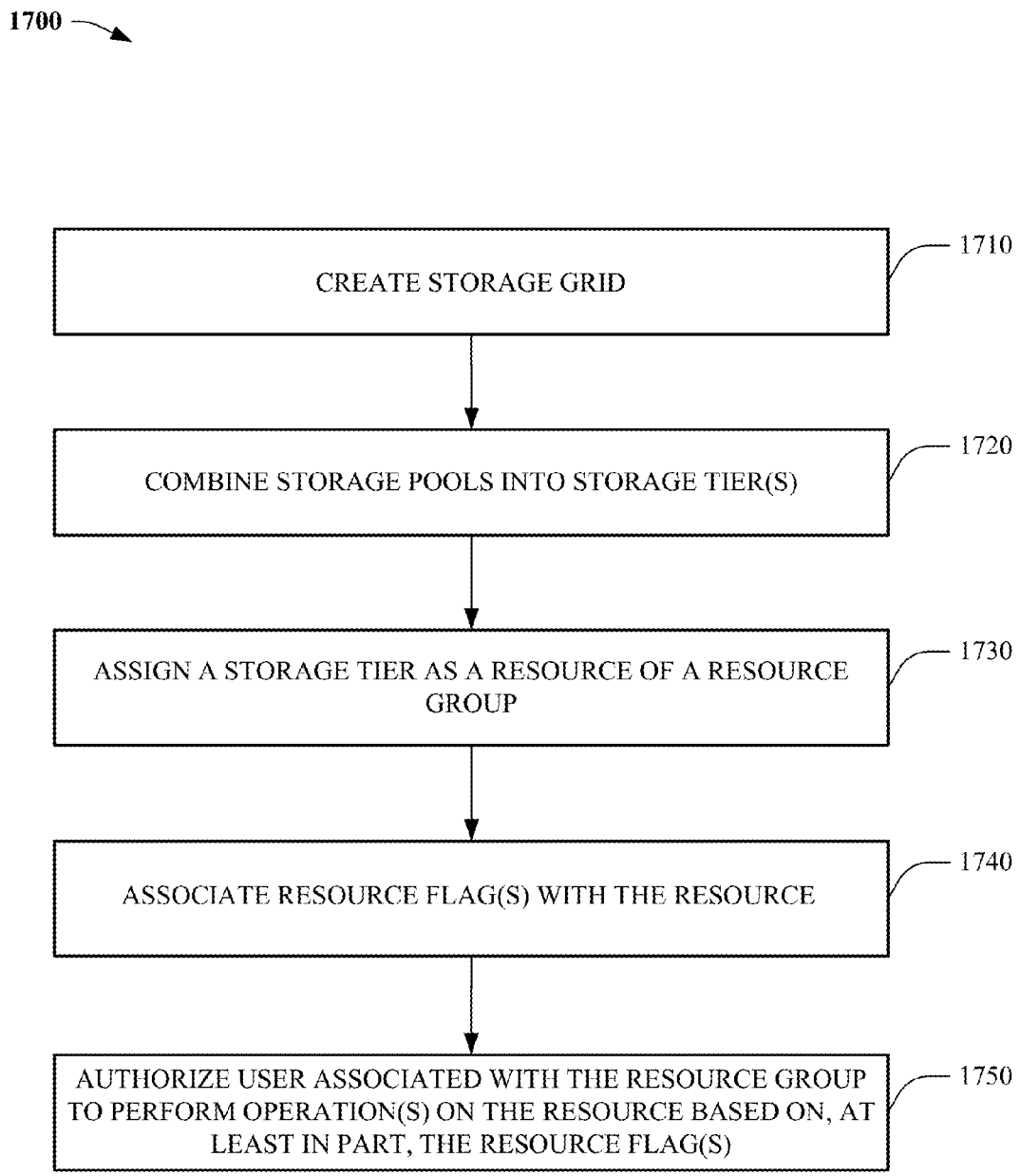

Now referring to FIG. 17, a process 1700 associated with a storage grid of storage systems is illustrated, in accordance with an embodiment. At 1710, a storage grid of storage systems, e.g., storage systems 100, 200, 300, 400, 500, etc. can be created. Storage pools of the storage systems can be combined into storage tiers, e.g., combining storage mediums of the storage pools into virtual storage volumes, at 1720. At 1730, such virtual storage volumes can be assigned, via associated storage tiers, as resource(s) of a resource group. One or more resource flags, e.g., resource flags 450 and/or 550, can be associated with the resource(s) at 1740. Further, one or more users associated with the resource group can be authorized, at 1750, to perform at least one operation on the resource(s) based on, at least in part, the one or more resource flags.

Figure 18:
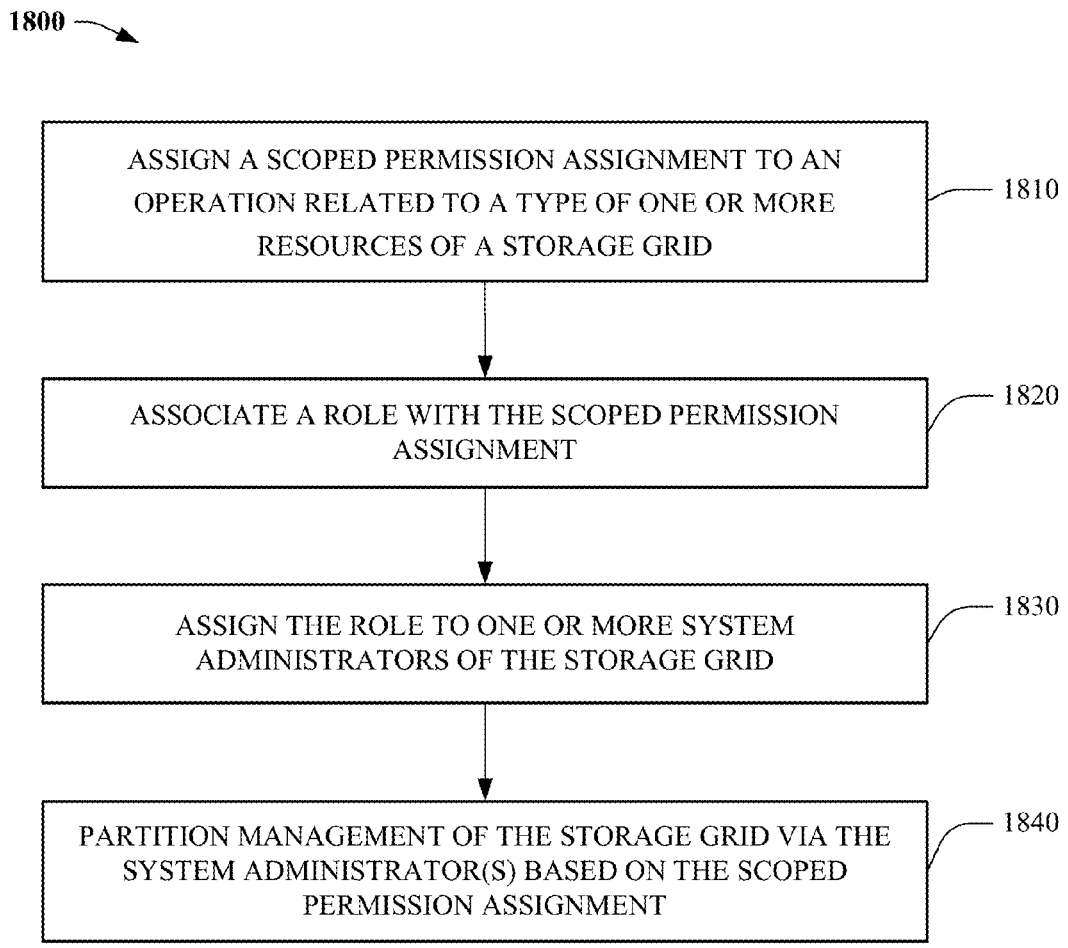

FIG. 18 illustrates a process 1800 for managing a storage grid (e.g., storage grid 700, storage grid 900), in accordance with an embodiment. At 1810, a scoped permission assignment can be assigned to an operation related to a type of one or more resources of the storage grid. In an aspect, the operation can include at least one of creating, modifying, or removing resources, e.g., storage mediums, storage pools, storage tiers, servers, computing resources, etc. of the storage grid. At 1820, a role can be associated with the scoped permission assignment; and the role can be assigned to one or more storage administrators of the storage grid at 1830. As such, management of the storage grid can be partitioned among the one or more system administrators, at 1840, based on scoped permission assignments assigned to roles associated with each of the one or more system administrators. In another aspect (not shown), one or more resource flags can be assigned to the one or more resources. Accordingly, management of the storage grid can be partitioned among the one or more system administrators via (1) a scoped permission assignment assigned to roles associated with each of the one or more system administrators and (2) one or more resource flags associated with an affected resource of the one or more resources.

Figure 19:
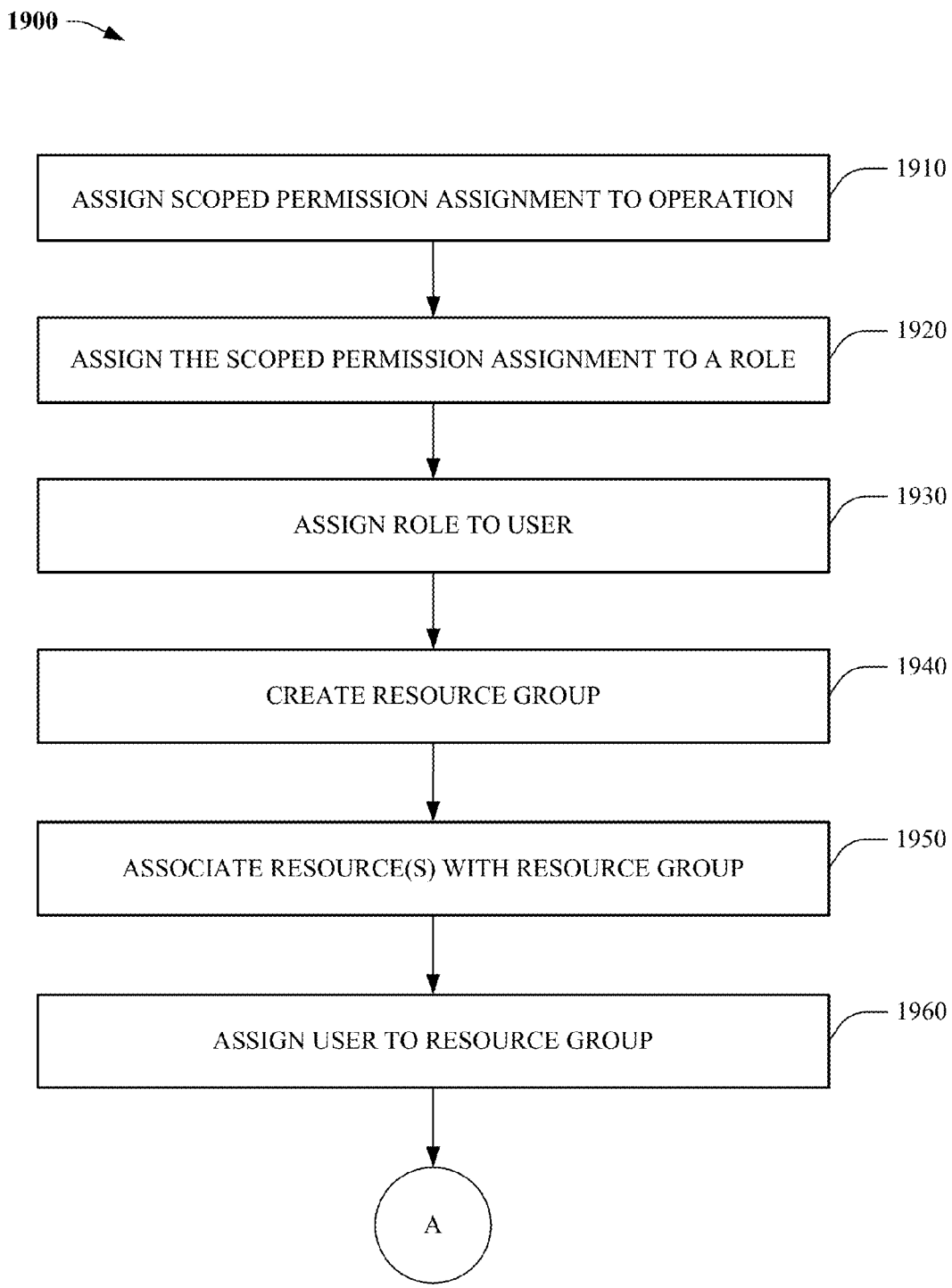
Figure 20:
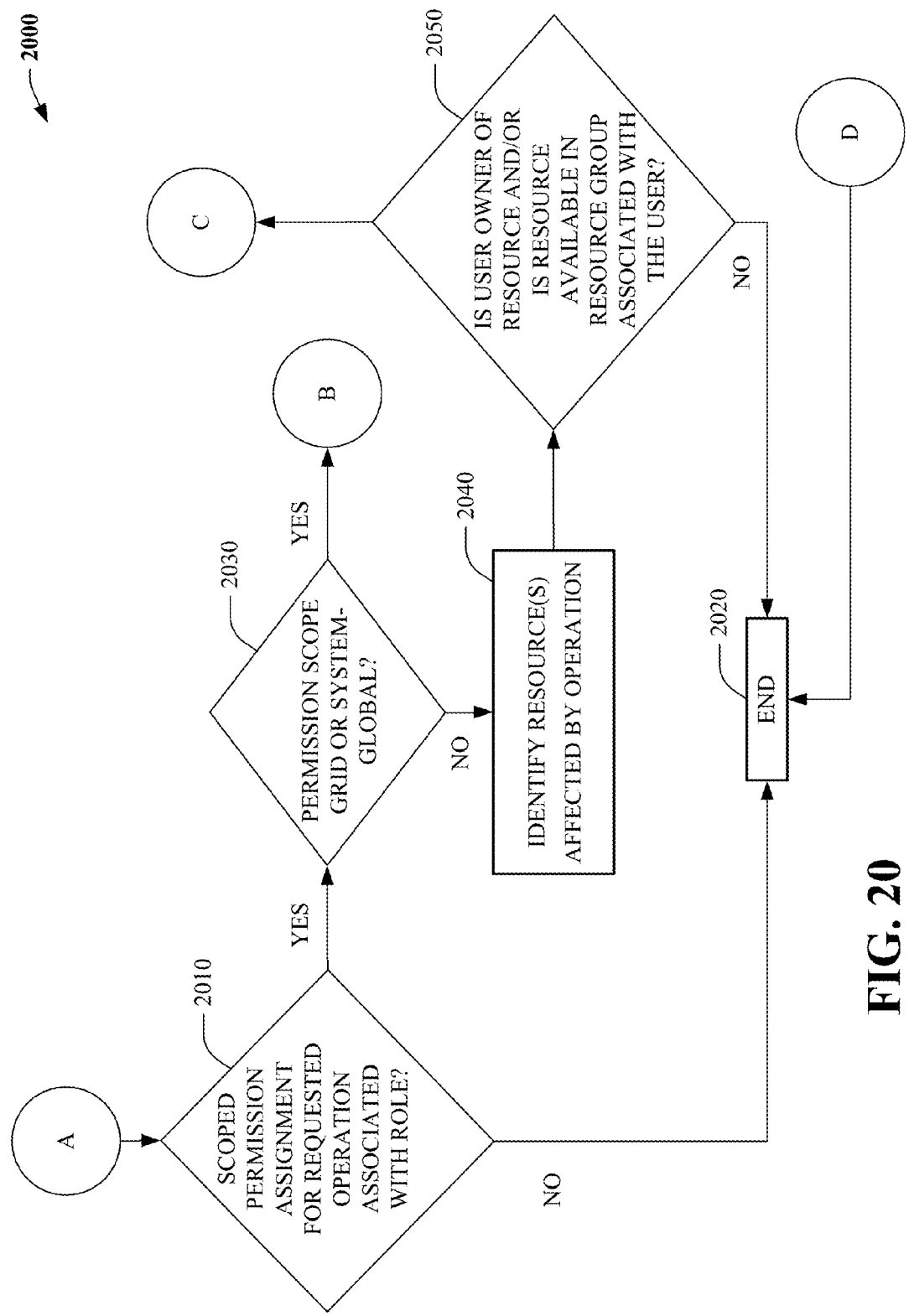
Figure 21:
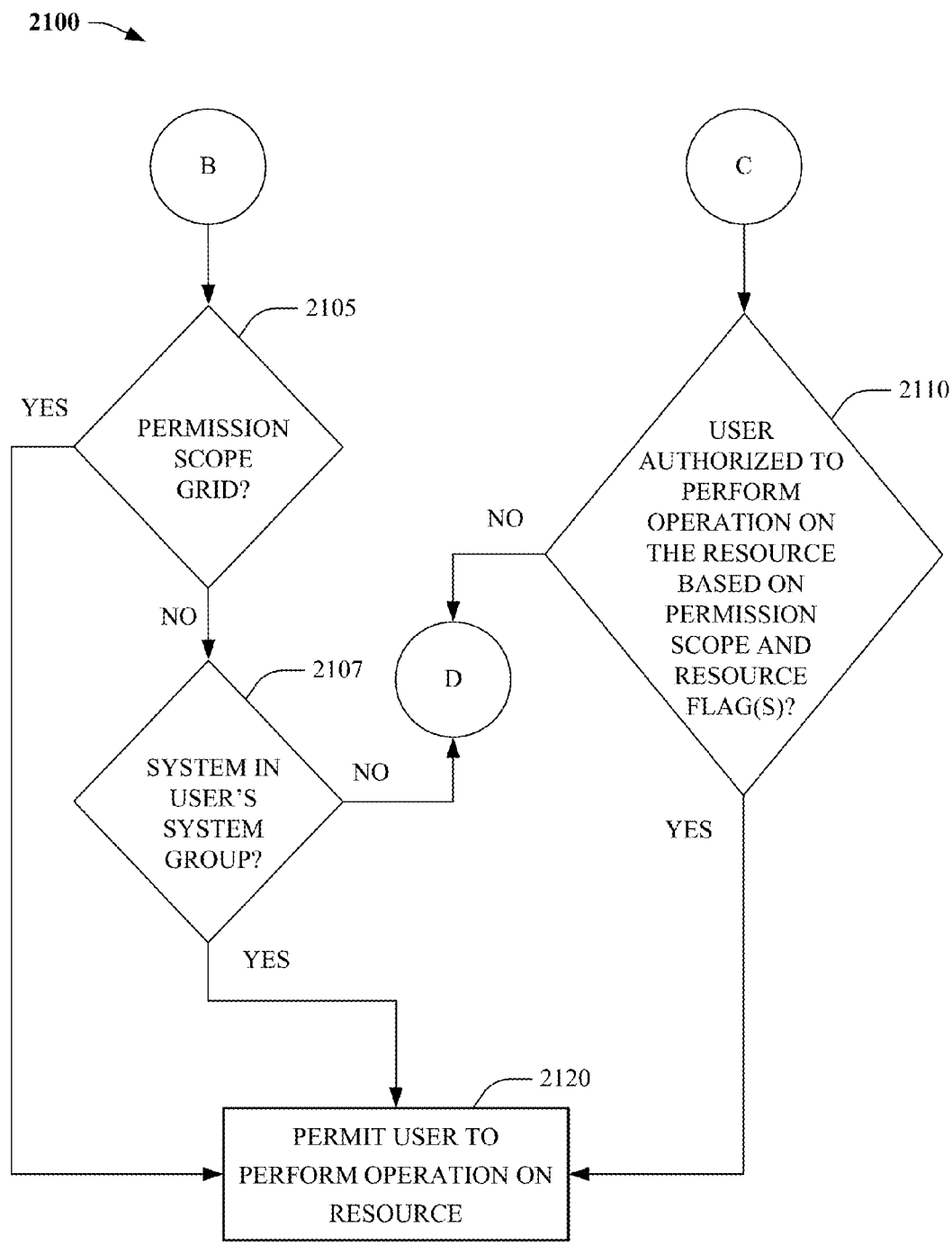

FIGS. 19-21 illustrate processes 1900, 2000, and 2100 for authorizing access to storage system resources by scoping resources and operations associated with such resources, in accordance with an embodiment. At 1910, a scoped permission assignment can be assigned to an operation, e.g., an operation described above with respect to system 200. The scoped permission assignment can be assigned to one or more roles at 1920; and the one or more roles can be assigned to one or more users of an associated storage system at 1930. A resource group can be created at 1940; and one or more resources, e.g., resources associated with system 200 and/or system 300 described above, can be included, or associated, with the resource group at 1950. At 1960, the one or more users can be assigned to the resource group, e.g., based on responsibilities within an organization employing the user(s)—the organization including at least two resource groups.

Continuing to 2010, e.g., when a user of a storage system seeks to perform an operation on a resource of the storage system, it can be determined whether a scoped permission assignment of the operation is associated with a role assigned to the user. If it is determined that the scoped permission assignment of the operation is not associated with a role assigned to the user, then the user can be prevented from performing the operation at 2020. On the other hand, if it is determined at 2010 that the scoped permission assignment of the operation is associated with a role assigned to the user, then it can be determined at 2030 whether a permission scope of the scoped permission assignment is a "grid-level" permission scope or a "system-global-level" permission scope.

If it is determined at 2030 that the permission-scope of the scoped permission assignment is not the grid-level permission scope or the system-global-level permission scope, then one or more resources affected by the operation can be identified at 2040. At 2050, it can be determined whether (1) the user owns the resource and/or (2) the resource is available in a resource group associated with the user. If it is determined that the resource is not owned by the user, or available in a resource group associated with the user, then the user can be prevented from performing the operation at 2020.

On the other hand, if it is determined at 2050 that the resource is available in a resource group associated with the user, and/or the user owns the resource, then it can be determined, at 2110, whether the user is authorized to perform the operation on the resource based on the permission-scope of the scoped permission assignment and one or more resource flags associated with the resource. If the user is authorized to perform the operation on the resource at 2110, the user can be permitted to perform the operation on the resource at 2120; otherwise, the user can be prevented from performing the operation at 2020. For example, if the operation is a "modify" operation and the one or more resource flags include the "immutable" or "global" resource flag, then flow can continue from 2110 to 2020, at which the user can be prevented from performing the operation; otherwise, flow can continue to 2120, at which the user can be permitted to perform the operation.

If it is determined at 2030 that the permission scope is the grid-level permission scope or the system-global-level permission scope, then flow can continue to 2105. At 2105, it can be determined whether the permission scope is the grid-level permission scope. If the permission scope is the grid-level permission scope, then the user can be authorized, or permitted, to perform the operation on the resource at 2120; otherwise, flow continues to 2107, at which it can be determined whether a system associated with the operation is in the user's storage system group. If it is determined that the system related to the operation is in, or associated, with the user's storage system group, then the user can be permitted to perform the operation on the resource at 2110; otherwise, the user can be prevented from performing the operation at 2020.

Figure 22:
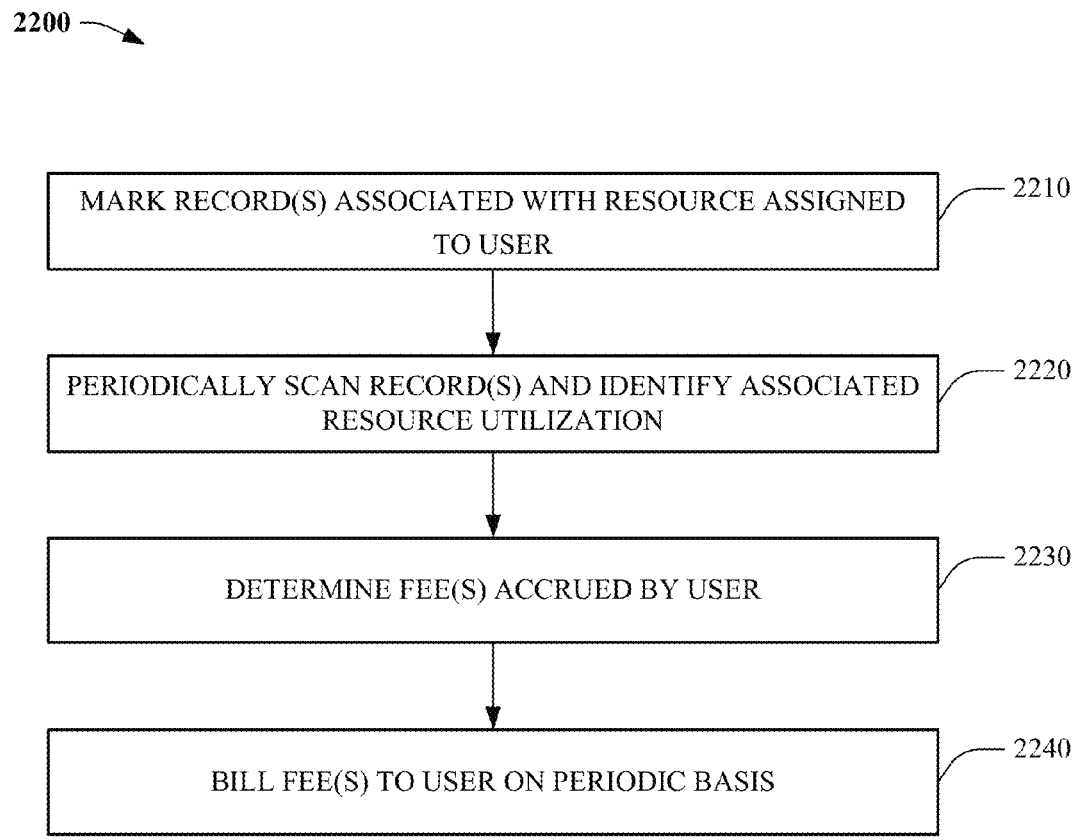

FIG. 22 illustrates a process 2200 for automatic billing associated with storage system resources, in accordance with an embodiment. At 2210, a resource assigned to a user of a storage system, e.g., storage system 100, 200, 300, 400, 500, etc. can be associated with the user via marking, e.g., recording, the association in a record, or database, of the storage system. Process 2200 can periodically scan the database at 2220, e.g., daily, to identify use of the resource, e.g., creation, assignment, utilization, etc. of the resource by the user. At 2230, process 2200 can determine fees accrued by the user, e.g., based on the use. Such fees can be billed to the user on a periodic basis, e.g., month end, at 2240.

Figure 23:
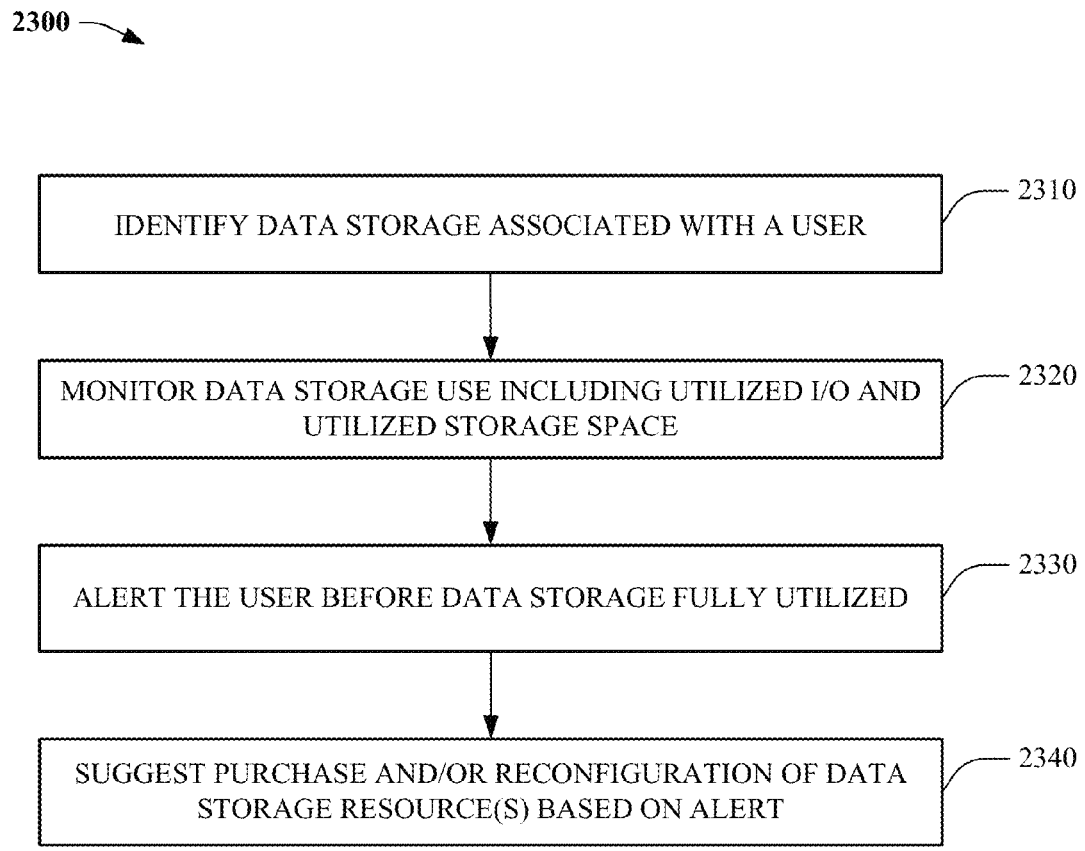

Now referring to FIG. 23, a process 2300 for monitoring usage of resources within a storage system is illustrated, in accordance with an embodiment. At 2310, data storage associated with a user of an associated storage system can be identified; and data storage use, e.g., utilized I/O and/or storage space, can be monitored at 2320, e.g., to determine whether a user has fully accessed all resources assigned to the user. At 2330, the user can be alerted, or notified, e.g., via email, text message, etc. when the user has almost used and/or accessed, fully utilized, or used an amount of assigned resources, e.g., within a predetermined range, assigned to the user. At 2340, process 2300 can suggest the user purchase more storage system resources and/or reconfigure the data storage based on the alert/notification. As such, process 2300 can proactively update data storage and/or storage system resources based on customer needs.

Figure 24:
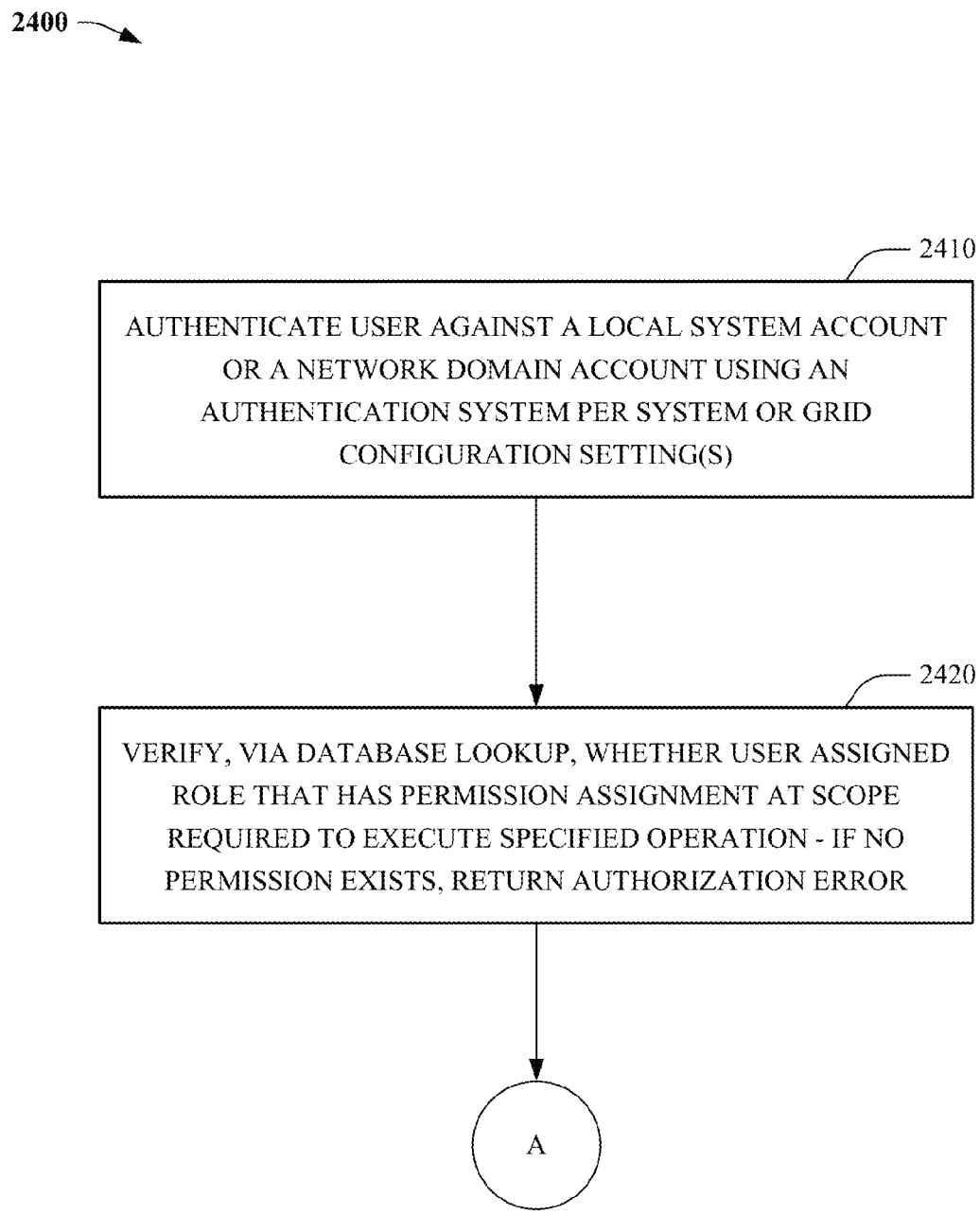
Figure 25:
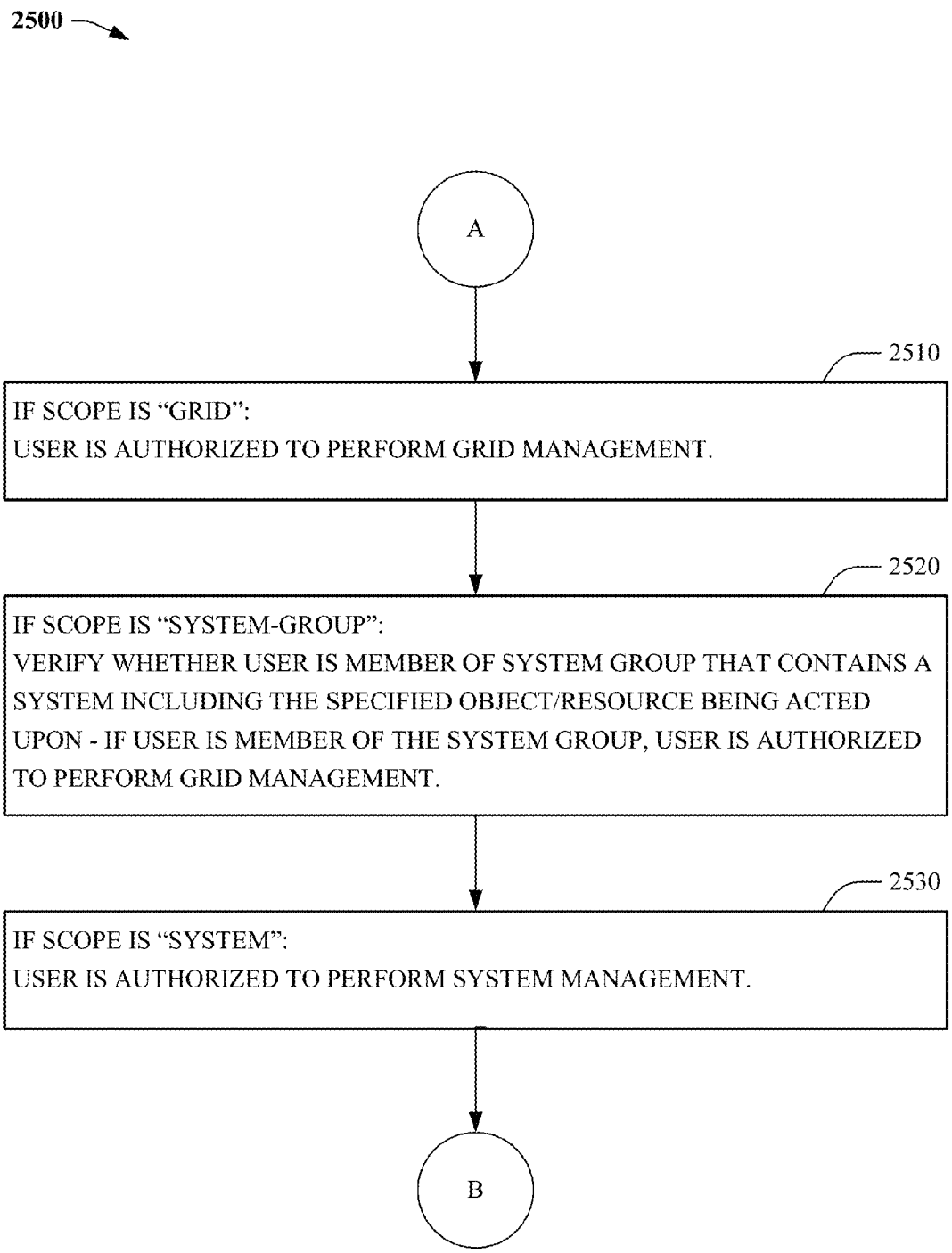
Figure 26:
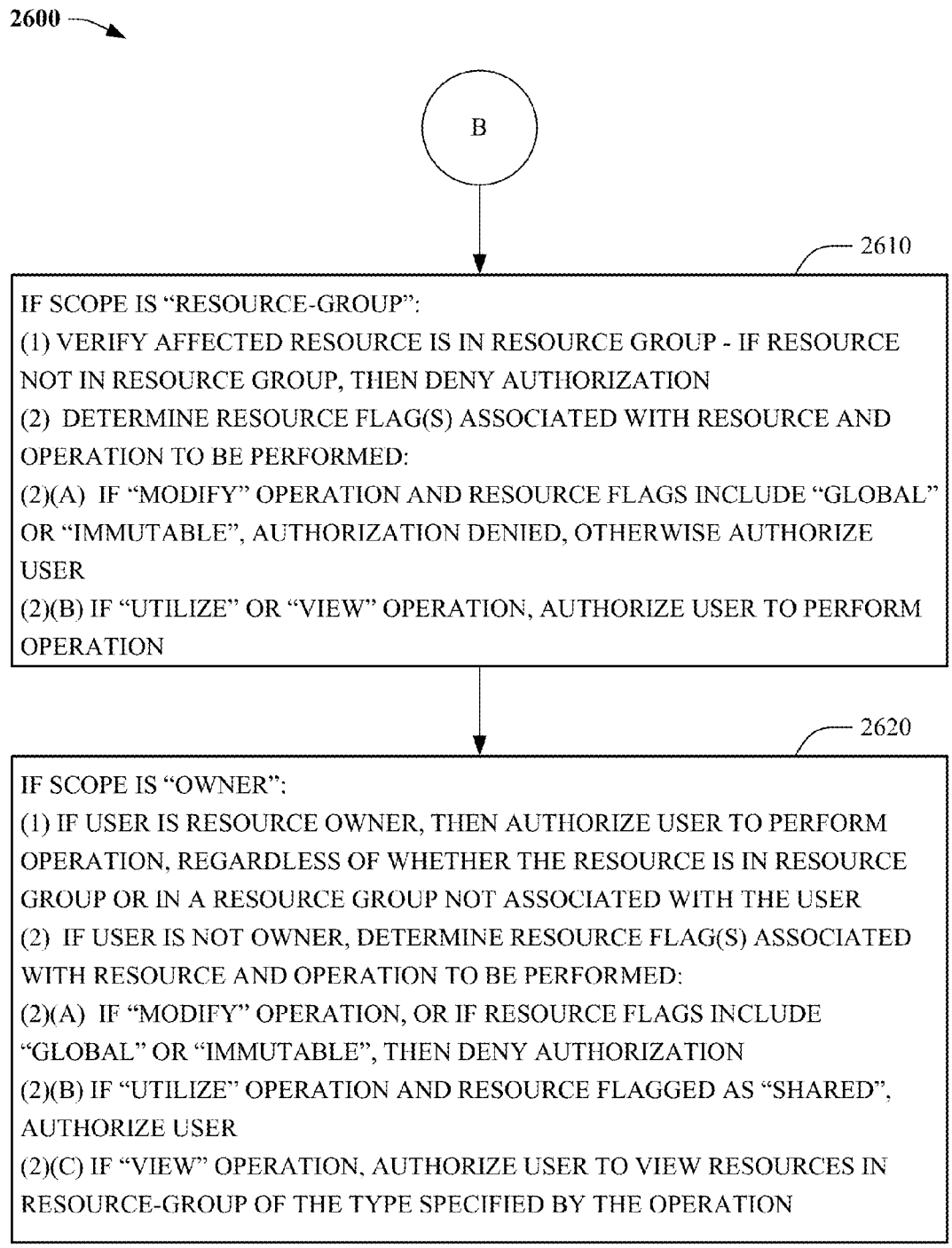

FIGS. 24-26 illustrate processes 2400, 2500, and 2600 for authorizing access to storage system resources by scoping resources and operations associated with such resources, in accordance with an embodiment. As illustrated by FIG. 24, a user can be authenticated, at 2410, against a local system account or a network domain account using an authentication system, e.g., Remote Authentication Dial In User Service (RADIUS), per system or grid configuration settings. A database lookup can verify, at 2420, whether the user is assigned a role that has a scoped permission assignment associated with a permission scope required to execute a specified operation; if no permission exists, an authorization error can be returned.

Now referring to FIG. 25, if the user is assigned a scoped permission assignment associated with a permission scope, then flow can continue to 2510, at which it can be determined whether the permission scope is a "grid-level" permission scope. If it is determined at 2510 that the permission scope is the grid-level permission scope, then the user can be authorized to perform management operations on resources associated with a storage grid (see above). If the permission scope is not a grid-level permission scope, then flow can continue to 2520, at which it can be determined whether the permission scope is a "system-group-level" permission scope. If the permission scope is the system-group-level permission scope, then it can be verified whether the user is a member of a system group that contains a system including a specified object/resource/etc. affected by the operation. If it is determined that the user is the member of the system group, then the user can be authorized to perform management operation(s) on a grid associated with the system group.

On the other hand, if the permission scope is not a system-group-level permission scope, then flow can continue to 2530, at which it can be determined whether the permission scope is a "system-level" permission scope. If it is determined that the permission scope is the system-level permission scope, then the user can be authorized to perform system management operation(s); otherwise, flow can continue to 2610, at which it can be determined whether the permission scope is a "resource-group" permission scope. At 2610, it can be determined whether the specified object/resource/etc. affected by the operation is in a resource group associated with the user. If the specified object/resource/etc. is not in the user's resource group, then an authorization error can be returned/authorization can be denied; otherwise, one or more resource flags associated with the operation to be performed can be utilized to authorize user access.

For example, if the operation is a "modify" operation and the one or more resource flags include a "global" or "immutable" resource flag, then authorization can be denied; otherwise, the user can be authorized to perform the operation on an associated resource. In another example, if the operation is a "utilize" or "view" operation, the user can be authorized to perform the operation, regardless of the one or more resource flags.

Returning now to FIG. 26, if the permission scope is not the resource-group permission scope, then flow can continue to 2620, at which it can be determined whether the permission scope is an "owner-level" permission scope. If it is determined that the user is designated owner of the resource, and the permission scope is the owner-level permission scope, then the user can be authorized to perform the operation—regardless of whether the resource is in the resource group or in a resource group not associated with the user. On the other hand, if it is determined that the user is not designated as owner of the resource, then one or more resource flags associated with the operation to be performed can be utilized to authorize user access.

For example, if the operation is a "modify" operation, and/or the one or more resource flags include the "global" or "immutable" resource flag, then authorization can be denied. If the operation is a "utilize" and the one or more resource flags include the "shared" resource flag, then the user can be authorized to perform the operation. If the operation is a "view" operation, the user can be authorized to view resources in the resource-group of the type specified by the operation.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 2722 (see below), disk storage 2724 (see below), and memory storage 2746 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 27:
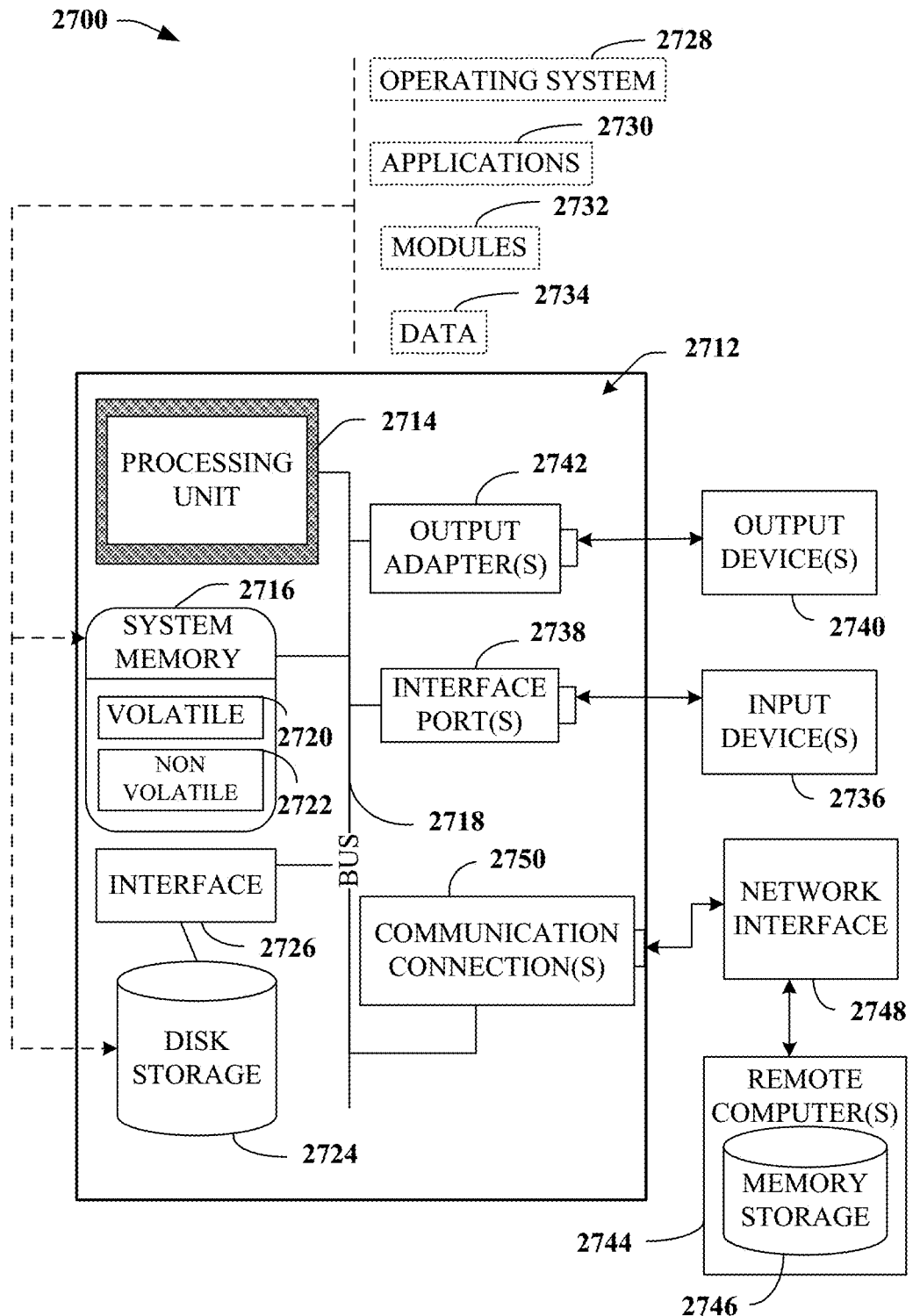
FIG. 27 illustrates a block diagram of a computing system operable to execute the disclosed systems and methods, in accordance with an embodiment.

In order to provide a context for the various aspects of the disclosed subject matter, FIG. 27, and the following discussion, are intended to provide a brief, general description of a suitable environment in which the various aspects of the disclosed subject matter can be implemented, e.g., various processes associated with FIGS. 13-23. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, handheld computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 27, a block diagram of a computing system 2700 operable to execute the disclosed systems and methods is illustrated, in accordance with an embodiment. Computer 2712 includes a processing unit 2714, a system memory 2716, and a system bus 2718. System bus 2718 couples system components including, but not limited to, system memory 2716 to processing unit 2714. Processing unit 2714 can be any of various available processors. Dual microprocessors and other multiprocessor architectures also can be employed as processing unit 2714.

System bus 2718 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 2716 includes volatile memory 2720 and nonvolatile memory 2722. A basic input/output system (BIOS), containing routines to transfer information between elements within computer 2712, such as during start-up, can be stored in nonvolatile memory 2722. By way of illustration, and not limitation, nonvolatile memory 2722 can include ROM, PROM, EPROM, EEPROM, or flash memory. Volatile memory 2720 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2712 can also include removable/non-removable, volatile/non-volatile computer storage media, networked attached storage (NAS), e.g., SAN storage, etc. FIG. 27 illustrates, for example, disk storage 2724. Disk storage 2724 includes, but is not limited to, devices like a magnetic disk drive, floppy disk drive, tape drive, Jaz drive, Zip drive, LS-100 drive, flash memory card, or memory stick. In addition, disk storage 2724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2724 to system bus 2718, a removable or non-removable interface is typically used, such as interface 2726.

It is to be appreciated that FIG. 27 describes software that acts as an intermediary between users and computer resources described in suitable operating environment 2700.

Such software includes an operating system 2728. Operating system 2728, which can be stored on disk storage 2724, acts to control and allocate resources of computer 2712. System applications 2730 take advantage of the management of resources by operating system 2728 through program modules 2732 and program data 2734 stored either in system memory 2716 or on disk storage 2724. It is to be appreciated that the disclosed subject matter can be implemented with various operating systems or combinations of operating systems.

A user can enter commands or information into computer 2712 through input device(s) 2736. Input devices 2736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 2714 through system bus 2718 via interface port(s) 2738. Interface port(s) 2738 include, for example, a serial port, a parallel port, a game port, and a universal serial bus (USB). Output device(s) 2740 use some of the same type of ports as input device(s) 2736.

Thus, for example, a USB port can be used to provide input to computer 2712 and to output information from computer 2712 to an output device 2740. Output adapter 2742 is provided to illustrate that there are some output devices 2740 like monitors, speakers, and printers, among other output devices 2740, which use special adapters. Output adapters 2742 include, by way of illustration and not limitation, video and sound cards that provide means of connection between output device 2740 and system bus 2718. It should be noted that other devices and/or systems of devices provide both input and output capabilities such as remote computer(s) 2744.

Computer 2712 can operate in a networked environment using logical connections to one or more remote computers, such as remote computer(s) 2744. Remote computer(s) 2744 can be a personal computer, a server, a router, a network PC, a workstation, a microprocessor based appliance, a peer device, or other common network node and the like, and typically includes many or all of the elements described relative to computer 2712.

For purposes of brevity, only a memory storage device 2746 is illustrated with remote computer(s) 2744. Remote computer(s) 2744 is logically connected to computer 2712 through a network interface 2748 and then physically connected via communication connection 2750. Network interface 2748 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2750 refer(s) to hardware/software employed to connect network interface 2748 to bus 2718. While communication connection 2750 is shown for illustrative clarity inside computer 2712, it can also be external to computer 2712. The hardware/software for connection to network interface 2748 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    assigning, by at least one computing device including at least one processor, a scoped permission assignment, comprising a bi-directional software class that links two software class types together, to a role identifier representing a role and an operation identifier representing a storage management operation to be performed on a resource type of a resource wherein the scoped permission assignment comprises a scope limiting applicability of the storage management operation on the resource type;
    assigning a user to the role;
    assigning the resource to a resource group and a resource permissions flag that limits storage management operations on the resource type;
    assigning the user to the resource group;
    receiving a request corresponding to the user to perform the storage management operation on the resource; and
    based on the request, in response to verifying that the resource is associated with the resource group that is assigned to the user, the resource permissions flag permits an execution of the storage management operation on the resource, and the user is associated with the role corresponding to the scoped permission assignment comprising the bi-directional software class that links the two software class types together and allowing the storage management operation to be performed on the resource, authorizing an execution of the storage management operation on the resource by the user, wherein the authorizing comprises authorizing a modification of the resource or a view of the resource, and wherein the authorizing the modification of the resource further comprises
    authorizing creation of at least one of a snapshot of a storage volume, a clone of the storage volume, a remote replication of the storage volume, a compression of the storage volume, an encryption of the storage volume, or a copy of the storage volume, or
    authorizing modification of a storage pool comprising a group of physical disks combined via at least one of a redundant array of independent disks or a fault tolerant scheme, or modification of a status of the storage pool.

2. The method of claim 1, wherein the authorizing the execution of the storage management operation comprises authorizing a utilization of the resource.

3. The method of claim 2, wherein the authorizing the utilization of the resource further comprises authorizing:

modification of at least one of the storage volume, the snapshot of the storage volume, or the clone of the storage volume;

modification of a storage volume group comprising at least two storage volumes that are configured to be acted upon as one storage volume;

access to the storage volume, wherein the storage volume is associated with a storage volume access control list from a specified host; or modification of a user reference, wherein the modification of the snapshot of the storage volume includes a description that describes whether changes were made to the storage volume, and wherein the clone of the storage volume includes the copy of the storage volume.

4. The method of claim 1, wherein the resource type includes:
   a storage volume type referencing the storage volume;
   a storage volume group type referencing a storage volume group including at least two storage volumes;
   a storage volume access control list type referencing a storage volume access control list defining one or more authorization privileges associated with at least one of the storage volume or the storage volume group;
   a storage pool type referencing the storage pool including at least one of two or more storage volumes or one or more storage volume groups;
   a storage system type referencing a virtual storage system or a physical storage system;
   a target port type referencing a target port;
   a physical disk type referencing a physical disk of the group of physical disks;
   a host type referencing a host;
   a host group type referencing a host group including at least two hosts;
   a storage tier type referencing a storage tier; or
   a storage system group type referencing a group of storage systems.

5. The method of claim 1, wherein the resource type includes:
   a task type referencing a task;
   an audit trail type referencing an audit trail;
   an alert type referencing an alert;
   an alert configuration type referencing a configuration of the alert;
   a license type referencing a license;
   a localization type referencing a localization of messages;
   an event type referencing an event;
   a custom application programming interface (API) type referencing a custom API;
   a custom object property type referencing a custom object property;
   a user type including a user reference referencing the user;
   a user group type including a user group reference referencing a user group including at least two users;
   a role type referencing the role;
   a resource group type including a resource group reference referencing the resource group; or
   a quota type referencing a quota associated with at least one of the resource, a virtual storage system, or a physical storage system.

6. The method of claim 1, wherein the authorizing the modification of the resource further comprises authorizing modification of at least one of:
   an audit trail;
   a configuration of an alert;
   a license;
   a custom application programming interface (API);
   a custom object property;
   a user reference;
   a user group reference;
   the role;
   a flag associated with the resource;
   a reference of the resource group; or
   a quota.

7. The method of claim 1, wherein the authorizing the view of the resource further comprises authorizing viewing of:
   the storage volume, a storage volume group, a storage volume access control list, the storage pool, a target port, a physical disk of the group of physical disks, a host, a host group, a task, an alert, an event, a user reference, a user group reference, the role, the resource group, or a quota.

8. The method of claim 1, wherein the authorizing the modification further includes authorizing the modification of the resource in response to determining that the scoped permission assignment includes a system-global-level permission scope.

9. The method of claim 8, wherein the authorizing the modification further includes authorizing the modification of the resource in response to determining the scoped permission assignment includes a permission scope associated with a hierarchy of permission scopes.

10. The method of claim 8, wherein the authorizing the execution further comprises:
    authorizing the execution of the storage management operation on the resource based on one or more resource flags; and
    authorizing an assignment of the one or more resource flags to the resource, wherein the one or more resource flags include at least one of a shared resource flag, an immutable resource flag, or a global resource flag.

11. The method of claim 10, wherein the authorizing the utilization further comprises authorizing the utilization of the resource in response to determining at least one of:
    the one or more resource flags include the shared resource flag and the scoped permission assignment includes the owner-level permission scope;
    the one or more resource flags include the shared resource flag and the global resource flag, and the scoped permission assignment includes the owner-level permission scope or the group-level permission scope;
    the one or more resource flags include the shared resource flag and the immutable resource flag, and the scoped permission assignment includes the owner-level permission scope or the group-level permission scope; or
    the one or more resource flags include the shared resource flag, the immutable resource flag, and the global resource flag, wherein the scoped permission assignment includes the owner-level permission scope, the group-level permission scope, or the system-global-level permission scope.

12. The method of claim 10, wherein the authorizing the modification further comprises authorizing the modification of the resource in response to determining at least one of:
    the one or more resource flags include the shared resource flag and the scoped permission assignment includes the group-level permission scope or the system-global-level permission scope;
    the one or more resource flags include the shared resource flag and the global resource flag, and the scoped permission assignment includes the system-global-level permission scope; or the one or more resource flags include the shared resource flag and the immutable resource flag, and the scoped permission assignment includes the system-global-level permission scope.

13. The method of claim 10, further comprising:
designating the user as an owner of the resource, wherein the authorizing the modification further comprises authorizing the modification of the resource by the owner in response to determining at least one of:
the scoped permission assignment includes the owner-level permission scope, the group-level permission scope, or the system-global-level permission scope; or
the one or more resource flags include the immutable resource flag and the scoped permission assignment includes the system-global-level permission scope.

14. The method of claim 10, wherein the authorizing the utilizing further comprises authorizing the utilizing the resource in response to determining the one or more resource flags include the immutable resource flag, and in response to determining the scoped permission assignment includes the owner-level permission scope or the group-level permission scope.

15. The method of claim 1, wherein the authorizing the modification of the resource further comprises authorizing:
modification of the storage volume;
modification of a storage volume group;
access to the storage volume associated with a storage volume access control list;
modification of a status of the storage pool;
modification of a virtual storage system or a physical storage system;
modification of one or more parameters associated with a target port comprising an Ethernet port that facilitates login of a host-side Internet small computer system interface initiator device;
modification of a host; or
modification of a host group.

16. A system, comprising:
at least one memory storing computer-executable instructions; and
at least one processor, communicatively coupled to the at least one memory, that facilitates execution of the computer-executable instructions to at least:
assign a user to one or more roles;
assign a scoped permission assignment comprising a bi-directional software class linking software class types to a role identifier representing a role of the one or more roles and an operation identifier representing a storage management operation to be performed on a resource type of a resource of the resources, wherein the scoped permission assignment comprises a scope limiting applicability of the storage management operation on the resource type;
assign the resource to a resource group of one or more resource groups using a resource group association comprising a resource identification representing the resource, a group identification representing the resource group, and a resource permissions flag that limits storage management operations on the resource type;
assign the user to the one or more resource groups;
receive a request corresponding to the user to perform the storage management operation on the resource;
permit, based on the request, an execution, by the user, of the storage management operation on the resource comprising a modification of the resource or a view of the resource in response to verifying that the resource is associated with the resource group, the user is associated with the resource group, the resource permissions flag permits an execution of the storage management operation on the resource, and the user is associated with the role corresponding to the scoped permission assignment comprising the bi-directional software class linking the software class types and allowing the storage management operation to be performed on the resource;
create a storage grid including at least two storage systems including a virtual storage system, wherein the virtual storage system includes one or more storage pools, and wherein a storage pool of the one or more storage pools includes one or more storage mediums;
combine storage pools of the one or more storage pools into one or more storage tiers;
assign a storage tier of the one or more storage tiers as a storage resource of the resource group;
permit the execution of the storage management operation on the storage resource based on one or more resource flags associated with the storage resource; and
automatically combine the storage pools based on at least one of a storage size of the one or more storage mediums or a utilization rate of the one or more storage mediums.

17. The system of claim 16, wherein the at least one processor further facilitates the execution of the computer-executable instructions to:
assign the one or more resource flags to the resource; and
permit the execution of the storage management operation on the resource based on the one or more resource flags.

18. The system of claim 16, wherein the at least one processor further facilitates the execution of the computer-executable instructions to:
assign one or more fees corresponding to the one or more storage tiers based on the storage size or the utilization rate; and
permit the execution of the storage management operation on the storage resource based on the one or more fees.

* * * * *